US011940753B2

(12) United States Patent
Katayama et al.

(10) Patent No.: US 11,940,753 B2
(45) Date of Patent: Mar. 26, 2024

(54) DEVELOPER SUPPLY CONTAINER AND DEVELOPER SUPPLYING SYSTEM

(71) Applicant: CANON KABUSHIKI KAISHA, Tokyo (JP)

(72) Inventors: Hiromasa Katayama, Tokyo (JP); Manabu Jimba, Tsukuba (JP); Akihito Kamura, Nagareyama (JP); Katsuya Murakami, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/130,926

(22) Filed: Apr. 5, 2023

(65) Prior Publication Data

US 2023/0244177 A1 Aug. 3, 2023

Related U.S. Application Data

(60) Division of application No. 17/386,739, filed on Jul. 28, 2021, now Pat. No. 11,650,537, which is a (Continued)

(30) Foreign Application Priority Data

Sep. 21, 2017 (JP) ................................ 2017-181803

(51) Int. Cl.
*G03G 15/08* (2006.01)
*G03G 21/16* (2006.01)

(52) U.S. Cl.
CPC ......... *G03G 21/1647* (2013.01); *G03G 15/08* (2013.01); *G03G 21/16* (2013.01); *G03G 21/1676* (2013.01)

(58) Field of Classification Search
CPC .... G03G 21/1647; G03G 15/08; G03G 21/16; G03G 21/1676; G03G 15/0872;

(Continued)

(56) References Cited

U.S. PATENT DOCUMENTS 4,740,767 A 4/1988 Kawano et al.
6,049,685 A 4/2000 Murakami et al.

(Continued)

FOREIGN PATENT DOCUMENTS

AU 2015202693 A1 11/2022
CN 1624599 A 6/2005

(Continued)

OTHER PUBLICATIONS

May 11, 2023 Office Action in Canadian Patent Application No. 3,076,599.

(Continued)

*Primary Examiner* — David J Bolduc
(74) *Attorney, Agent, or Firm* — Venable LLP

(57) ABSTRACT

An engaging portion 30 is provided which is engageable with a portion-to-be-engaged 11*b* a displaceable integrally with a developer receiving portion 11 with a mounting operation of a developer supply container 1 to displace 11 in an upward direction U to bring a receiving opening into communication with a discharge opening. An engaging portion 30 includes a first engagement surface 31*a* extending in the upward direction U as going toward a developer accommodating portion of the developer supply container 1, and a second engagement surface 32*a* provided at a position closer to the developer accommodating portion than the first engagement surface 31*a*. When the receiving opening in communication with a shutter opening, a height of an end of the first engagement surface 31*a* close to the developer accommodating portion is higher than the second engagement surface 32*a*.

1 Claim, 21 Drawing Sheets

(a)

(b)

Related U.S. Application Data division of application No. 16/751,759, filed on Jan. 24, 2020, now Pat. No. 11,150,598, which is a division of application No. 16/354,681, filed on Mar. 15, 2019, now Pat. No. 10,558,161, which is a continuation of application No. PCT/JP2018/036617, filed on Sep. 21, 2018.

(58) Field of Classification Search
CPC ....... G03G 15/0886; G03G 2215/0668; G03G 2221/1654
See application file for complete search history.

(56) References Cited

U.S. PATENT DOCUMENTS

| | | | |
|---|---|---|---|
| 6,128,453 | A | 10/2000 | Ban et al. |
| 6,278,853 | B1 | 8/2001 | Ban et al. |
| RE38,737 | E | 5/2005 | Ban et al. |
| 7,242,893 | B2 | 7/2007 | Murakami et al. |
| 7,412,192 | B2 | 8/2008 | Nakajima et al. |
| 7,486,915 | B2 | 2/2009 | Koyama et al. |
| 7,738,818 | B2 | 6/2010 | Murakami et al. |
| 8,000,614 | B2 | 8/2011 | Okino et al. |
| 8,150,299 | B2 | 4/2012 | Iino |
| 8,391,753 | B2 | 3/2013 | Takashima et al. |
| 8,649,711 | B2 | 2/2014 | Nakajima et al. |
| 8,918,030 | B2 | 12/2014 | Kimura et al. |
| 9,229,368 | B2 | 1/2016 | Okino et al. |
| 9,348,261 | B2 | 5/2016 | Enokuchi et al. |
| 9,354,549 | B1 | 5/2016 | Okino et al. |
| 9,360,827 | B2 | 6/2016 | Nakajima |
| 9,383,681 | B2 | 7/2016 | Takagi et al. |
| 9,383,686 | B2 | 7/2016 | Murakami |
| 9,535,369 | B2 | 1/2017 | Kamura et al. |
| 9,588,461 | B2 | 3/2017 | Kamura et al. |
| 9,696,684 | B2 | 6/2017 | Maeshima et al. |
| 9,720,349 | B2 | 8/2017 | Yamaoka et al. |
| 9,760,059 | B2 | 9/2017 | Katayama |
| 9,811,024 | B2 | 11/2017 | Yomoda et al. |
| 10,088,773 | B2 | 10/2018 | Yamaoka et al. |
| 10,088,775 | B2 | 10/2018 | Kamura et al. |
| 10,209,667 | B2 | 2/2019 | Jimba et al. |
| 10,289,060 | B2 | 5/2019 | Jimba et al. |
| 2004/0265010 | A1 | 12/2004 | Otani |
| 2005/0123320 | A1 | 6/2005 | Okamoto et al. |
| 2005/0147428 | A1 | 7/2005 | Yamada |
| 2005/0214668 | A1 | 9/2005 | Miyakawa et al. |
| 2006/0104673 | A1 | 5/2006 | Sasae et al. |
| 2007/0223970 | A1 | 9/2007 | Kawai |
| 2009/0185824 | A1 | 7/2009 | Murakami et al. |
| 2009/0214227 | A1 | 8/2009 | Noh et al. |
| 2009/0220269 | A1 | 9/2009 | Wu et al. |
| 2009/0297226 | A1 | 12/2009 | Nagashima et al. |
| 2010/0129119 | A1 | 5/2010 | Nagashima et al. |
| 2010/0316414 | A1 | 12/2010 | Saito et al. |
| 2011/0064461 | A1 | 3/2011 | Ishii et al. |
| 2012/0045244 | A1 | 2/2012 | Komatsu et al. |
| 2012/0134717 | A1 | 5/2012 | Nagashima et al. |
| 2012/0155924 | A1 | 6/2012 | Iino |
| 2013/0077994 | A1 | 3/2013 | Takiguchi |
| 2013/0156463 | A1 | 6/2013 | Jung et al. |
| 2013/0209140 | A1 | 8/2013 | Murakami et al. |
| 2013/0387448 | | 10/2013 | Baker et al. |
| 2014/0153974 | A1 | 6/2014 | Jimba et al. |
| 2014/0169835 | A1 | 6/2014 | Nakajima |
| 2015/0010334 | A1 | 1/2015 | Nakajima |
| 2015/0043944 | A1 | 2/2015 | Yamamoto |
| 2015/0248102 | A1 | 9/2015 | Nakajima |
| 2016/0004186 | A1 | 1/2016 | Jimba et al. |
| 2016/0004187 | A1 | 1/2016 | Yomoda et al. |
| 2016/0209803 | A1 | 7/2016 | Katayama |
| 2016/0223981 | A1 | 8/2016 | Enokuchi et al. |
| 2017/0242367 | A1 | 8/2017 | Jimba et al. |
| 2017/0351212 | A1 | 12/2017 | Enokuchi et al. |
| 2018/0024465 | A1 | 1/2018 | Yomoda et al. |
| 2019/0018340 | A1 | 1/2019 | Yamaoka et al. |
| 2019/0018341 | A1 | 1/2019 | Yamaoka et al. |
| 2019/0212672 | A1 | 7/2019 | Gamo et al. |
| 2019/0212674 | A1 | 7/2019 | Murakami et al. |
| 2019/0212693 | A1 | 7/2019 | Okino et al. |

FOREIGN PATENT DOCUMENTS

| | | | |
|---|---|---|---|
| CN | 1773388 | A | 5/2006 |
| CN | 101706644 | A | 5/2010 |
| CN | 102428415 | A | 4/2012 |
| CN | 103250102 | A | 8/2013 |
| CN | 103733141 | A | 4/2014 |
| CN | 104880926 | A | 9/2015 |
| EP | 2 624 068 | A | 9/2011 |
| EP | 2 720 088 | A | 4/2014 |
| EP | 2 924 511 | A1 | 9/2015 |
| JP | 2014-198800 | A | 7/2004 |
| JP | 2005-107141 | A | 4/2005 |
| JP | 2010-26683 | A | 11/2010 |
| JP | 2011-123447 | A | 6/2011 |
| JP | 2013-015826 | A | 1/2013 |
| JP | 2014-215417 | A | 11/2014 |
| JP | 2015-026012 | A | 2/2015 |
| JP | 2015-036704 | A | 2/2015 |
| JP | 2015-161898 | A | 9/2015 |
| KR | 100938069 | B1 | 1/2010 |
| KR | 2010-0132083 | | 12/2010 |
| KR | 2010-0134136 | | 12/2010 |
| KR | 2011-0056207 | | 5/2011 |
| KR | 2013-0068086 | | 6/2013 |
| KR | 2014-0041599 | | 4/2014 |
| KR | 2015-0043527 | | 4/2015 |
| KR | 2015-0102689 | | 9/2015 |
| KR | 2015-0122807 | | 11/2015 |
| KR | 10-2020-0051774 | A | 5/2020 |
| RU | 2 390 420 | C1 | 5/2010 |
| RU | 2412456 | C2 | 2/2011 |
| RU | 2 419 120 | C2 | 5/2011 |
| RU | 2461034 | C2 | 9/2012 |
| RU | 2 597 669 | C1 | 9/2016 |
| RU | 2 621 460 | C2 | 6/2017 |
| RU | 2 628 667 | A | 8/2017 |

OTHER PUBLICATIONS

International Search Report and Written Opinion for International Patent Application No. PCT/JP2018/036617, dated Nov. 6, 2018.

Oct. 15, 2020 Decision to Grant in Russian Patent Application No. 2020113610 (with English translation).

Office Action dated Jan. 4, 2021 in counterpart Korean Application No. 2021-000529768.

May 10, 2021 Office Action in Indian Patent Application No. 202047015871.

May 31, 2021 Office Action in Canadian Patent Application No. 3,076,599.

Jul. 2, 2021 Decision to Grant in Russian Patent Application No. 2020141256 (with English translation).

Aug. 18, 2021 Office Action in German Patent Application No. 11 2018 004 623.0 (with English translation).

Sep. 21, 2021 Office Action in Japanese Patent Application Pub. No. 2017-181803 (with English translation).

Jan. 19, 2022 Office Action in Chinese Patent Application No. 201880060155.0 (with English translation).

Jan. 3, 2022 Notice of Allowance in Korean Patent Application No. 10-2021-7010090.

Apr. 14, 2022 Decision to Grant in Russian Patent Application No. 2021125872/28 (with English translation).

Dec. 23, 2022 Extended Search Report in European Patent Application Pub. No. 22 190 764.5.

Jan. 9, 2023 Office Action in Korean Patent Application Pub. No. 10-2022-7040857.

Aug. 11, 2022 Office Action in Australian Patent Application No. 2021212027.

Aug. 19, 2022 Notice of Allowance in Korean Patent Application Pub. No. 10-2021-7033025.

(56) References Cited

OTHER PUBLICATIONS

Sep. 8, 2021 Search Report and Sep. 30, 2021 Notice of Allowance in Eurasian Patent Application No. 202190652 (with English translation).
Aug. 25, 2021 Extended Search Report in European Patent Application No. 18 859 375.0.

(a)

(b)

(a)

(b)

(c)

(a)

(b)

(a)

(b)

(a)

(b)

(a)

(b)

(a)

(b)

(a)

(b)

(a)

(b)

DEVELOPER SUPPLY CONTAINER AND DEVELOPER SUPPLYING SYSTEM

TECHNICAL FIELD

The present invention relates to a developer supply container dismountably mountable to a developer receiving apparatus and a developer supplying system.

BACKGROUND ART

Conventionally, in electrophotographic image forming apparatuses such as copying machines, fine developing powder such as toner has been used. In such an image forming apparatus, the developer consumed by the image formation is supplemented from a developer supply container.

For example, a structure has been proposed in which the developer supply container is mountable to and dismountable from a developer receiving apparatus provided in the image forming apparatus, and the developer receiving portion of the developer receiving apparatus is displaced toward the discharge opening of the developer supply container in accordance with the mounting operation of the developer supply container (JP2013-015826A).

SUMMARY OF THE INVENTION

Problems to be Solved by Invention

It is an object of the present invention to provide a developer supplying container and a developer supplying system capable of improving the sealing property of a connecting portion between a developer supply container and a developer receiving portion.

Means for Solving the Problem

There is provided a developer supply container detachably mountable to a developer receiving apparatus, said developer receiving apparatus including a developer receiving portion provided with a receiving port for receiving a developer and including a portion-to-be-engaged capable of displacing integrally with said developer receiving portion, said developer supply container comprising a rotatable developer accommodating portion for accommodating the developer; a discharging portion provided at a bottom side thereof with a discharge opening for discharging the developer accommodating in said developer accommodating portion; an engaging portion engageable with the portion-to-be-engaged with a mounting operation of said developer supply container to displace said developer receiving portion in a displacing direction so as to bring the receiving opening into fluid communication with said discharge opening; and a supporting portion provided upstream of said engaging portion in an inserting direction in which said developer accommodating portion is inserted into the developer receiving apparatus, said supporting portion extending in a direction of a rotational axis of said developer accommodating portion, and said supporting portion being capable of supporting the portion-to-be-engaged delivered from said engaging portion, and wherein when said discharge opening and the receiving opening are in fluid communication with each other, a maximum height of said engaging portion is higher than a supporting surface of said supporting portion which supports the portion-to-be-engaged.

Effect of the Invention

According to the present invention, it is possible to improve the sealing property of the connecting portion between the developer supply container and the developer receiving portion.

Figure 3:
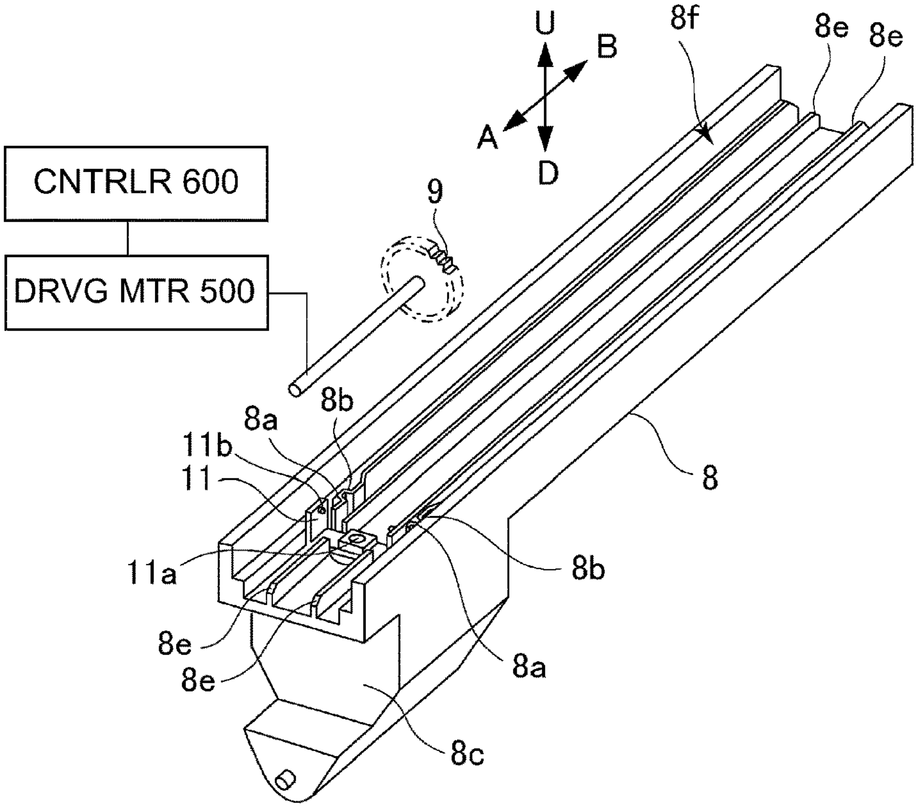
Figure 3:
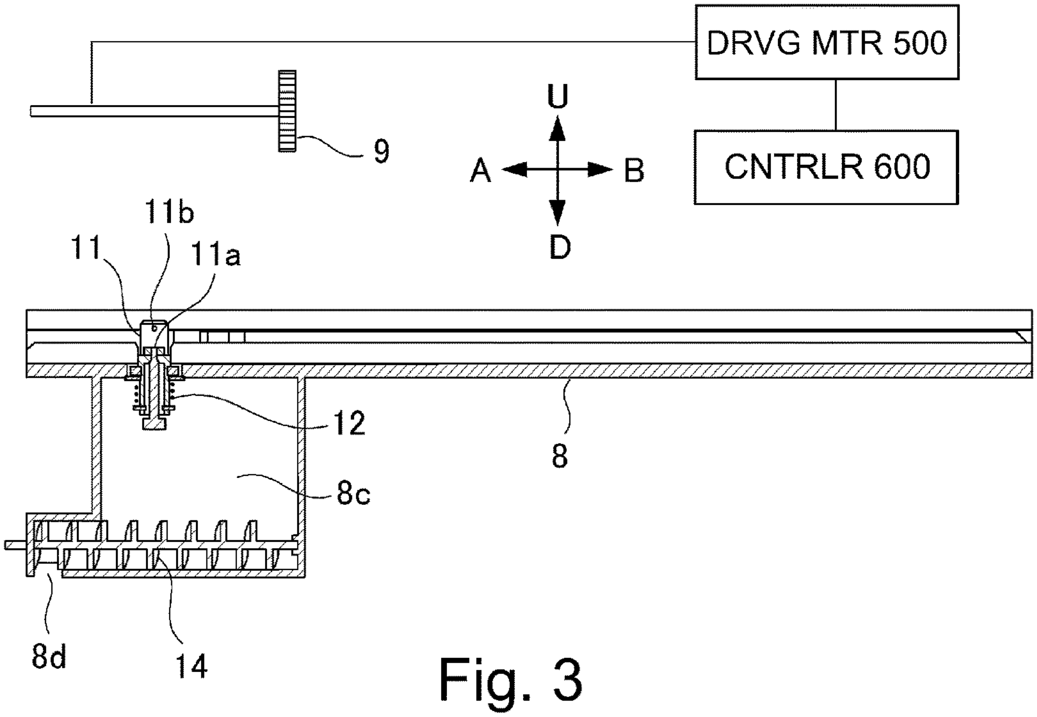

Parts (a) and (b) of FIG. 3 show a developer receiving apparatus according to Embodiment 1, in which part (a) is a perspective view thereof, and part (b) is a cross-sectional view thereof.

Figure 4:
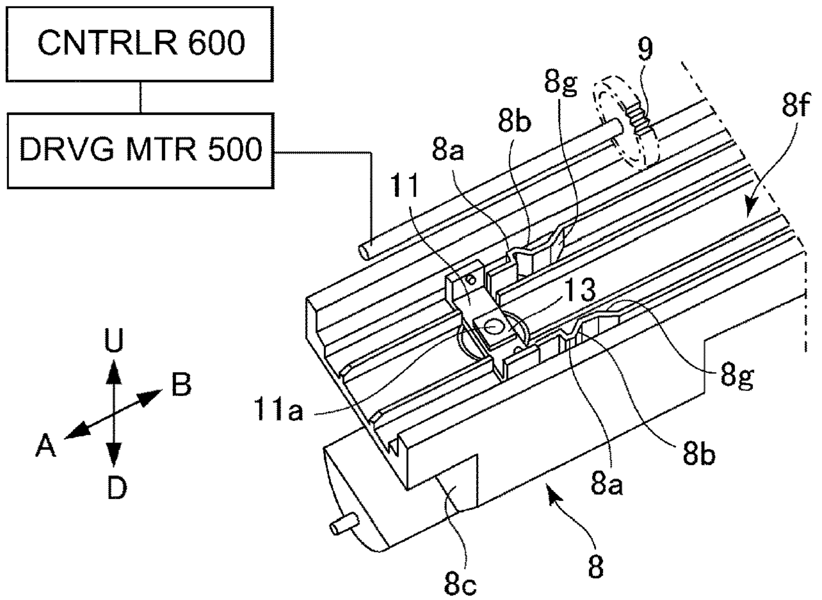
Figure 4:
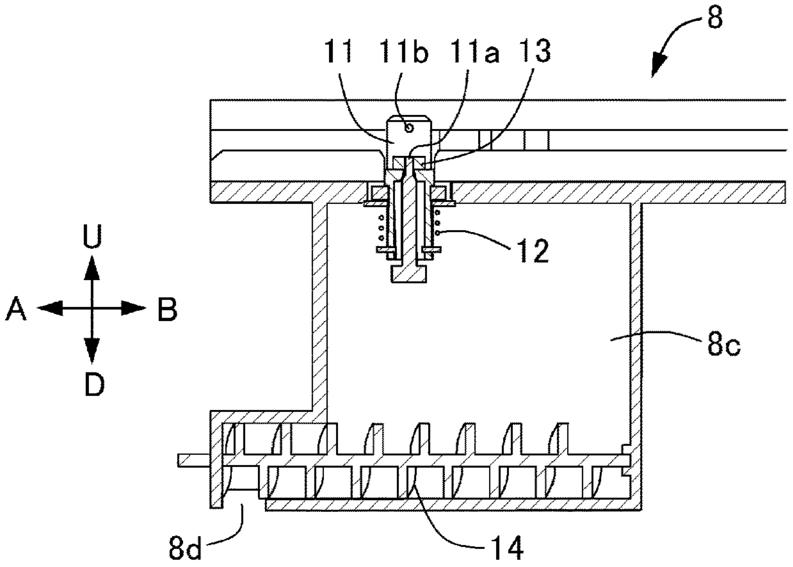
Figure 4:
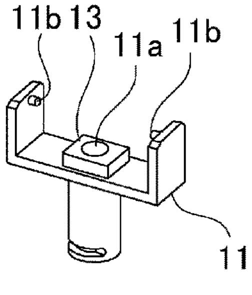

Parts (a), (b) and (c) of FIG. 4 show a developer receiving apparatus according to Embodiment 1, in which part (a) is an enlarged partial perspective view thereof, part (b) is an enlarged cross sectional view thereof, and part (c) is a perspective view of a developer receiving portion.

Figure 5:
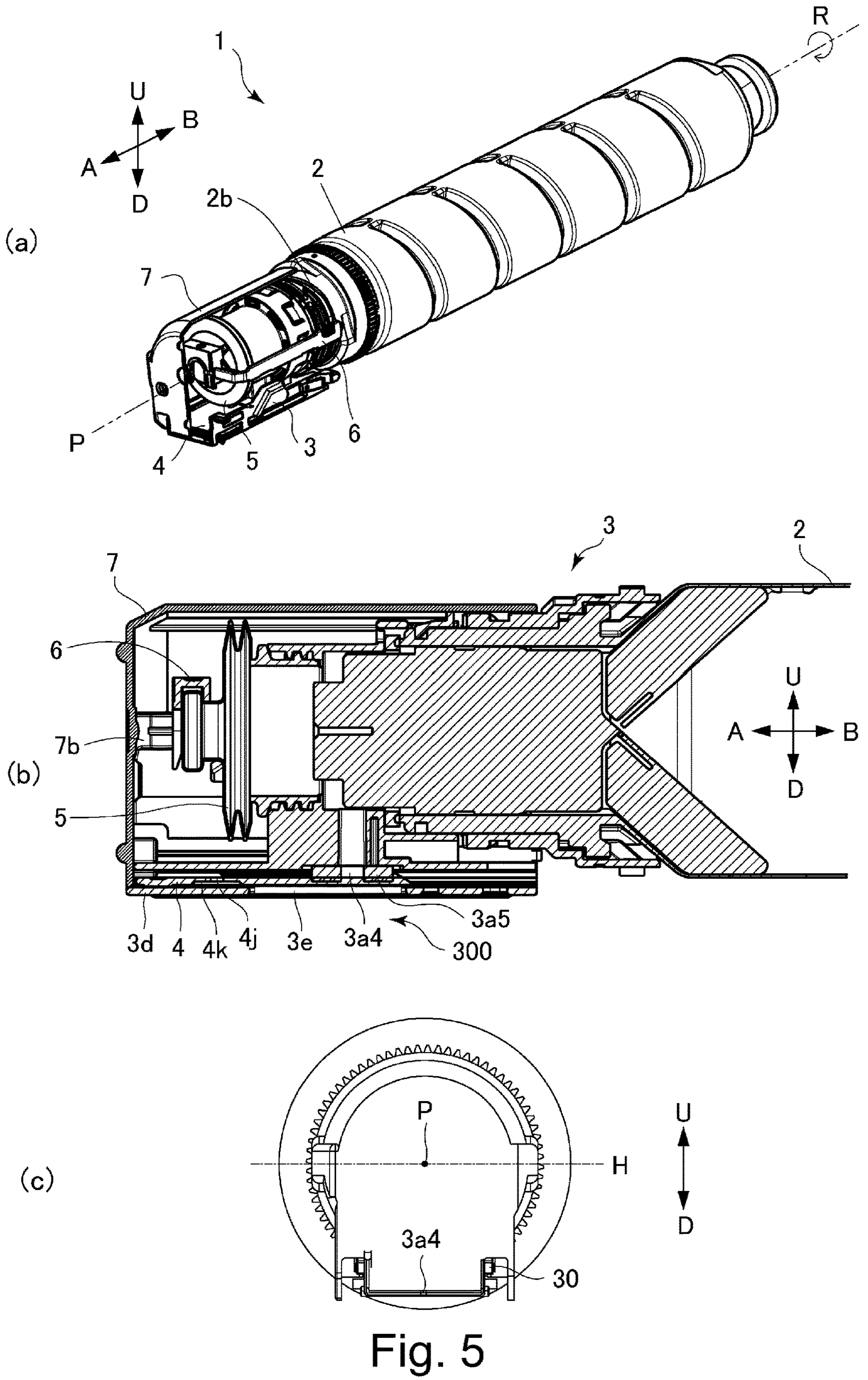

Parts (a), (b) and (c) of FIG. 5 show a developer supply container according to Embodiment 1, in which part (a) is a partially cut-away perspective view, part (b) is a cross-sectional view thereof around a flange portion, and (c) is a front elevational view thereof as viewed from a front side.

Figure 6:
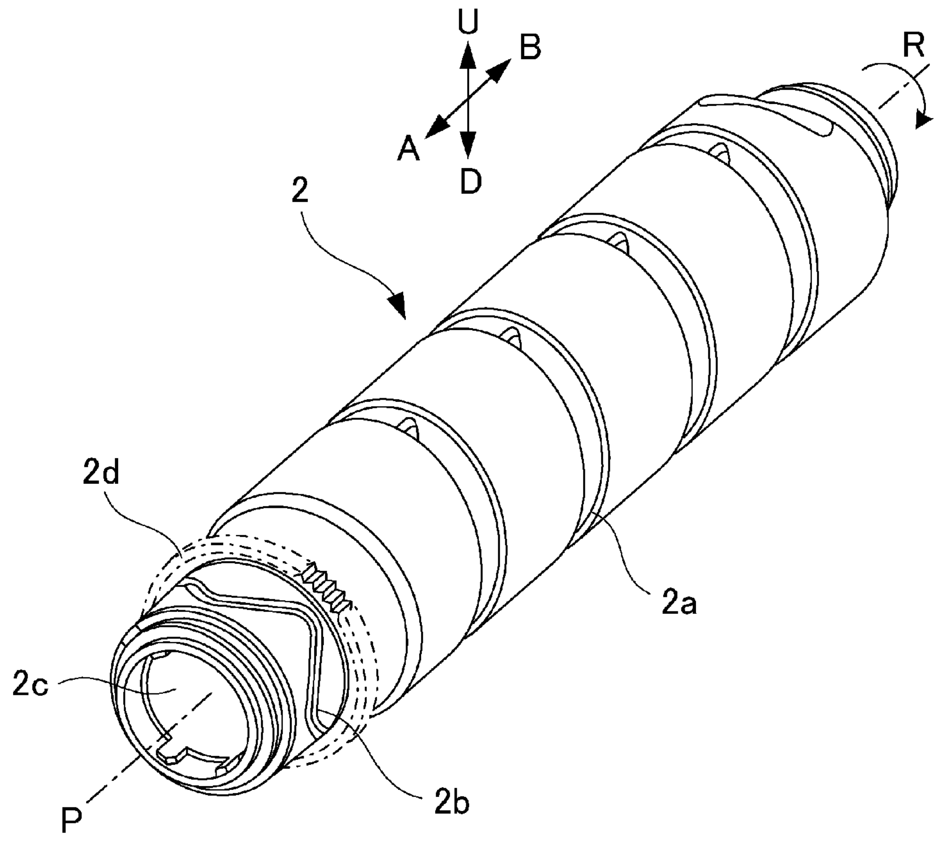

FIG. 6 is a perspective view of the container main body of the developer supply container according to Embodiment 1.

Figure 7:
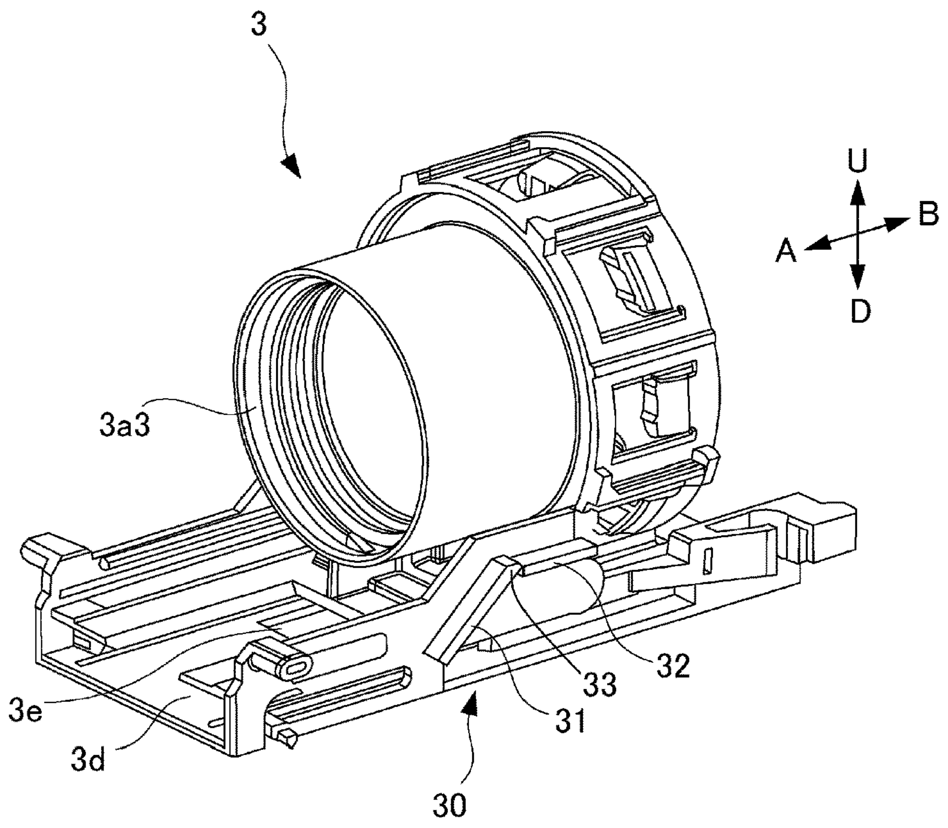
Figure 7:
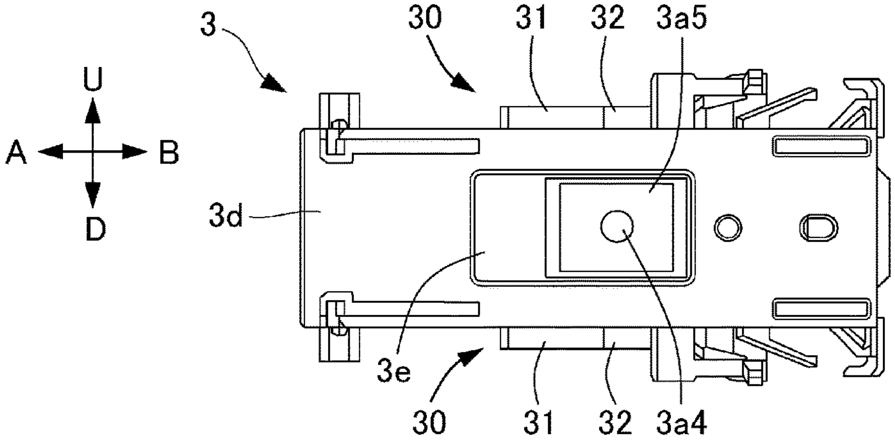

Parts (a) and (b) of FIG. 7 show a flange portion in Embodiment 1, in which part (a) is a perspective view thereof, and (b) is a bottom view thereof.

Figure 8:
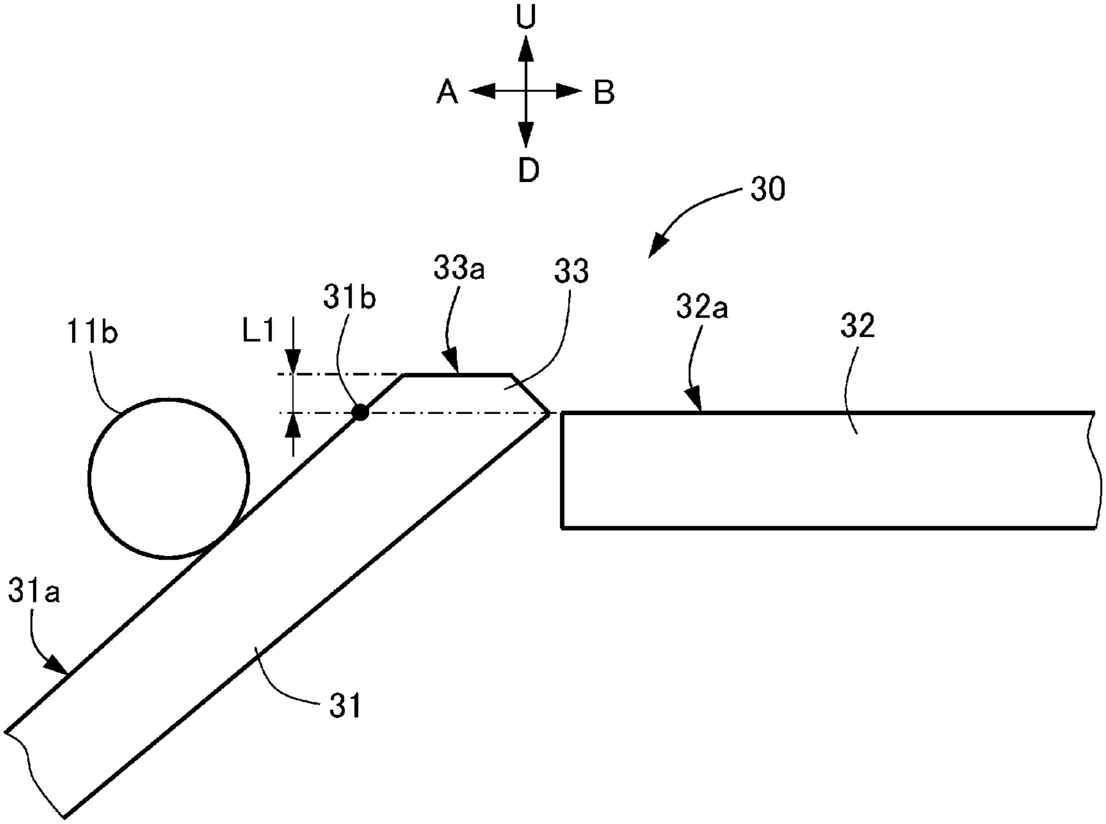

FIG. 8 is a partial side view of an engaging portion according to 5 Embodiment 1.

Figure 9:
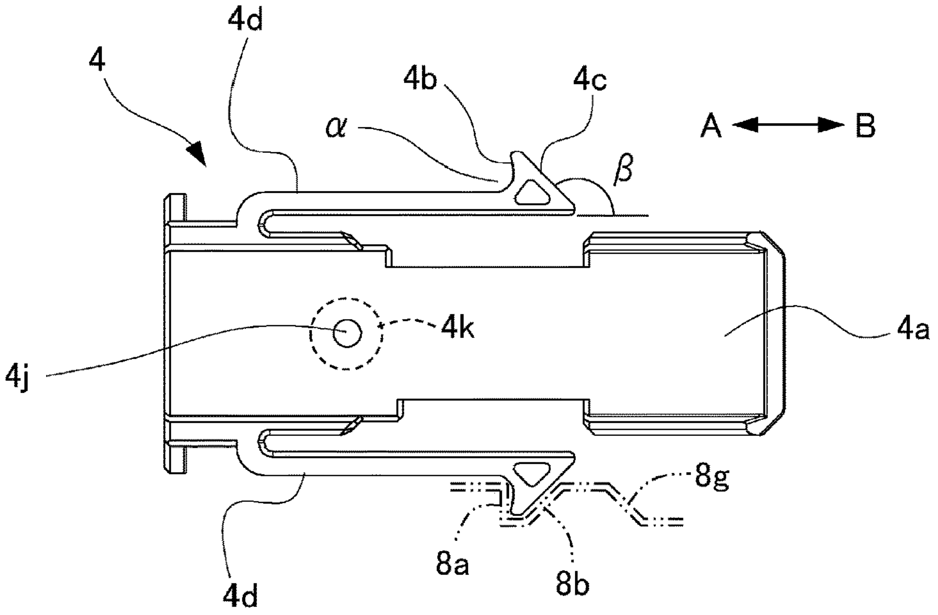
Figure 9:
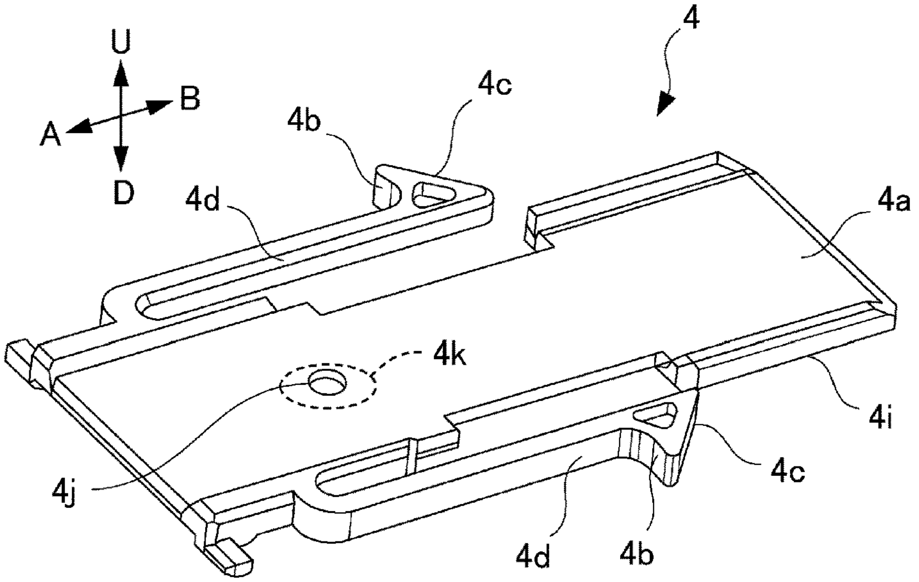

Part (a) of FIG. 9 is a top plan view of the shutter according to Embodiment 1, and part (b) of FIG. 9 is a perspective view thereof.

Figure 10:
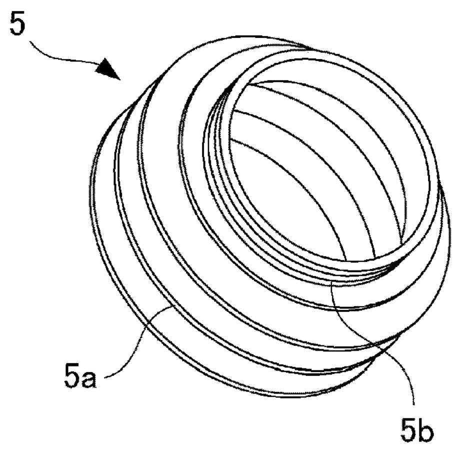
Figure 10:
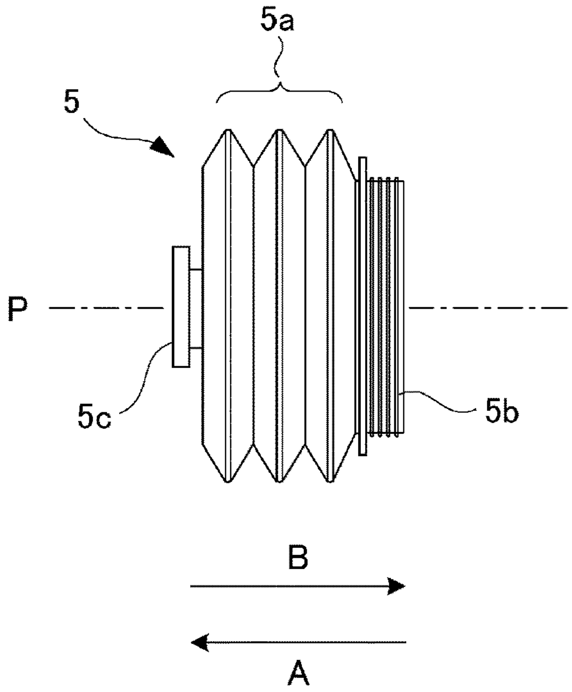

Part (a) of FIG. 10 is a perspective view of a pump according to Embodiment 1, and (b) is a side view thereof.

Figure 11:
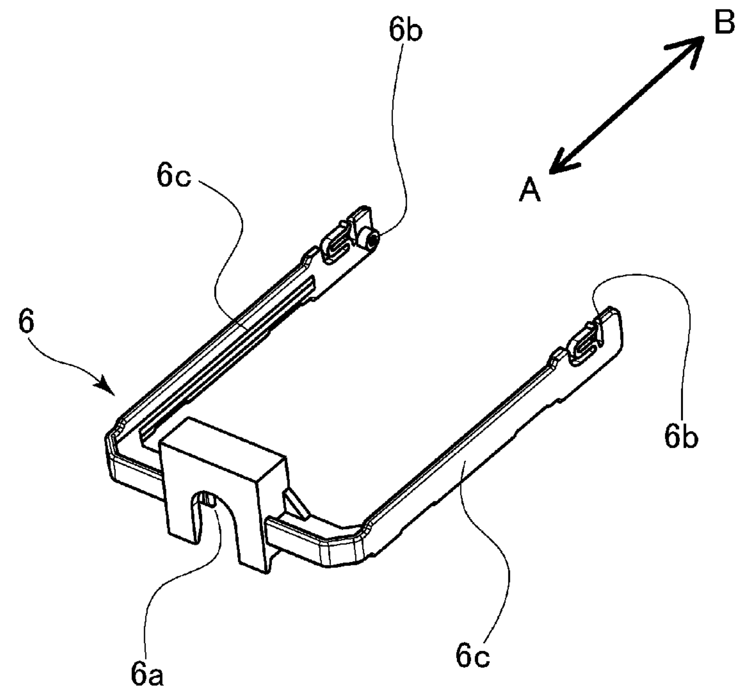
Figure 11:
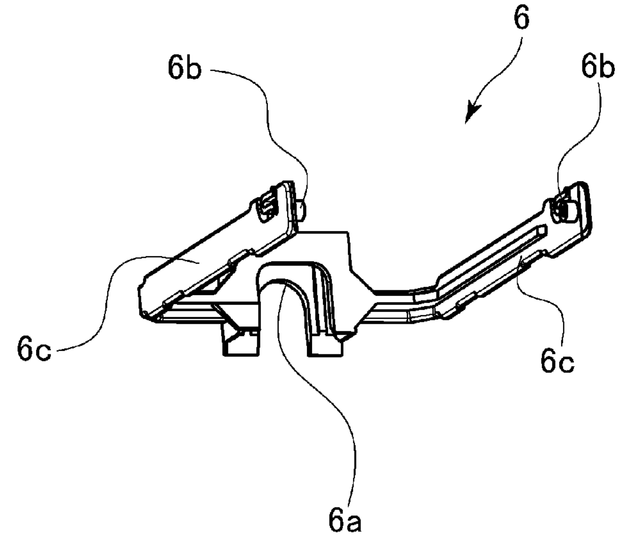

Part (a) of FIG. 11 is a perspective view of a reciprocating member according to Embodiment 1, and part (b) of FIG. 11 is a perspective view thereof as seen from the opposite side of part (a) of FIG. 11.

Figure 12:
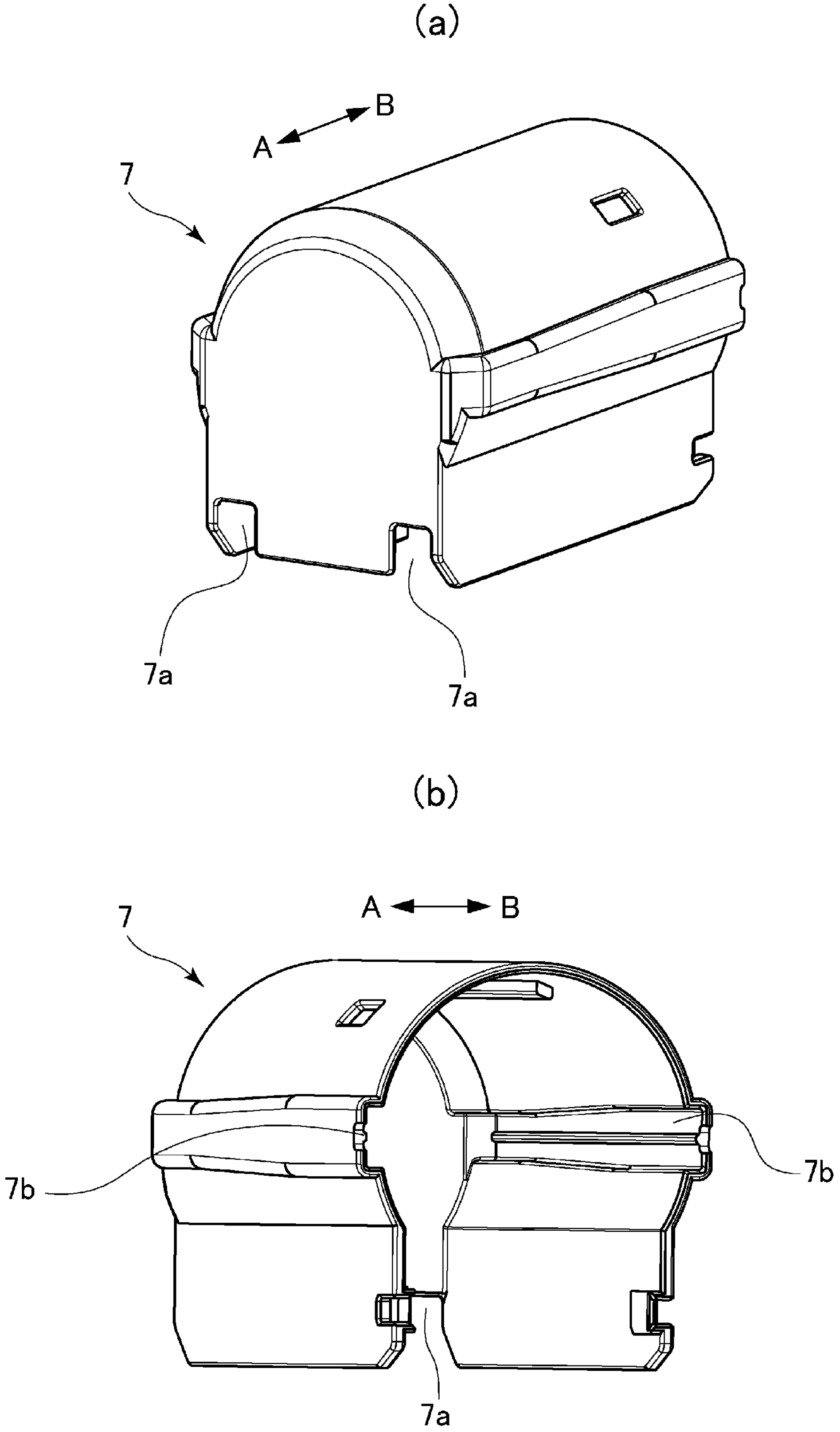

Part (a) of FIG. 12 is a perspective view of a cover according to Embodiment 1, and part (b) of FIG. 12 is a perspective view thereof as seen from the opposite side to that in part (a) of FIG. 12.

Figure 13:
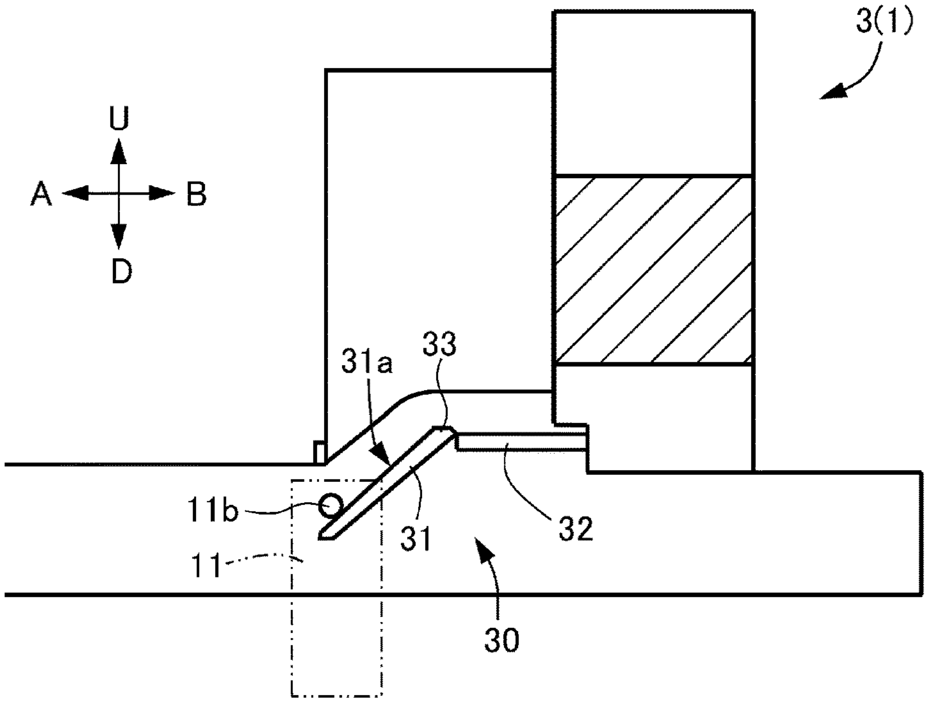
Figure 13:
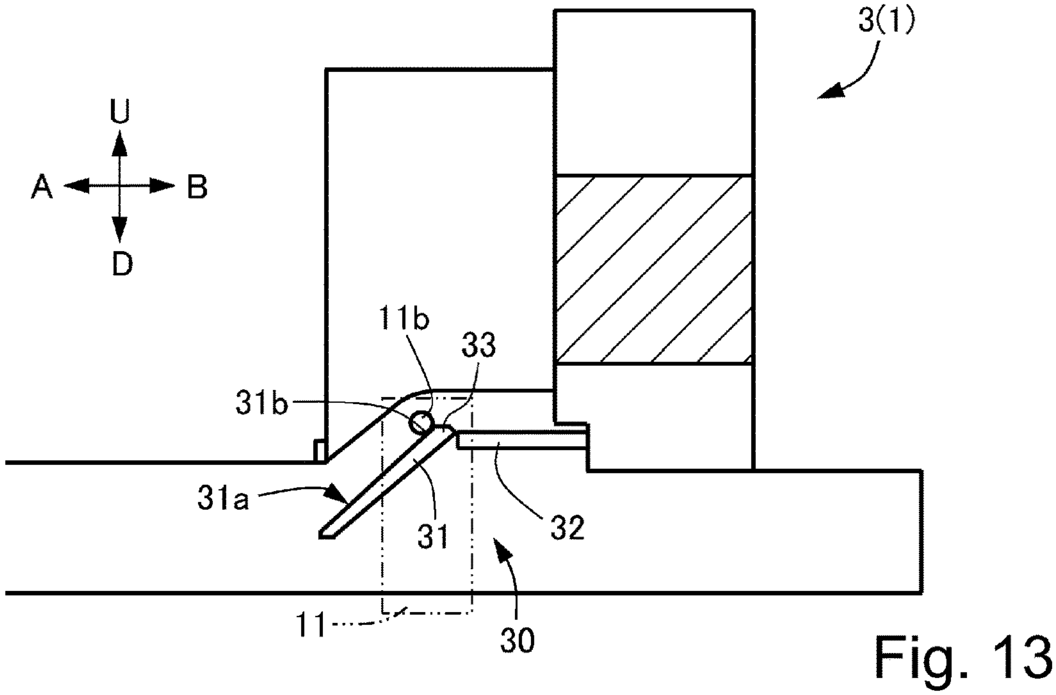

Part (a) of FIG. 13 is a side view of a state when the engaged portion is engaged with the first engaging surface in the engaging portion with the insertion of the developer supply container, according to Embodiment 1, part (b) of FIG. 13 is a side view of the state when the engaged portion is located at the upstream side end portion in the mounting direction of the first engaging surface.

Figure 14:
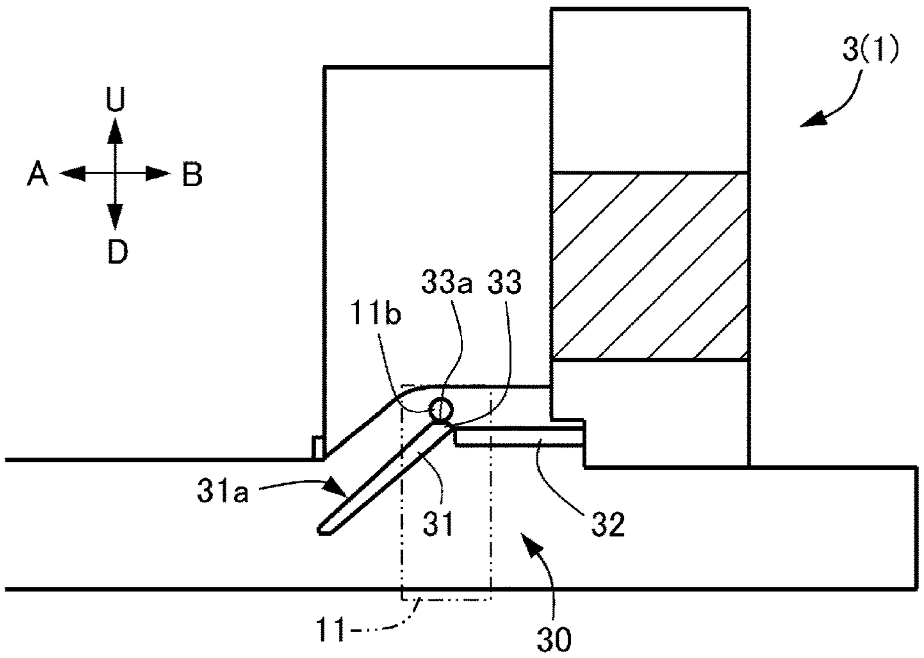
Figure 14:
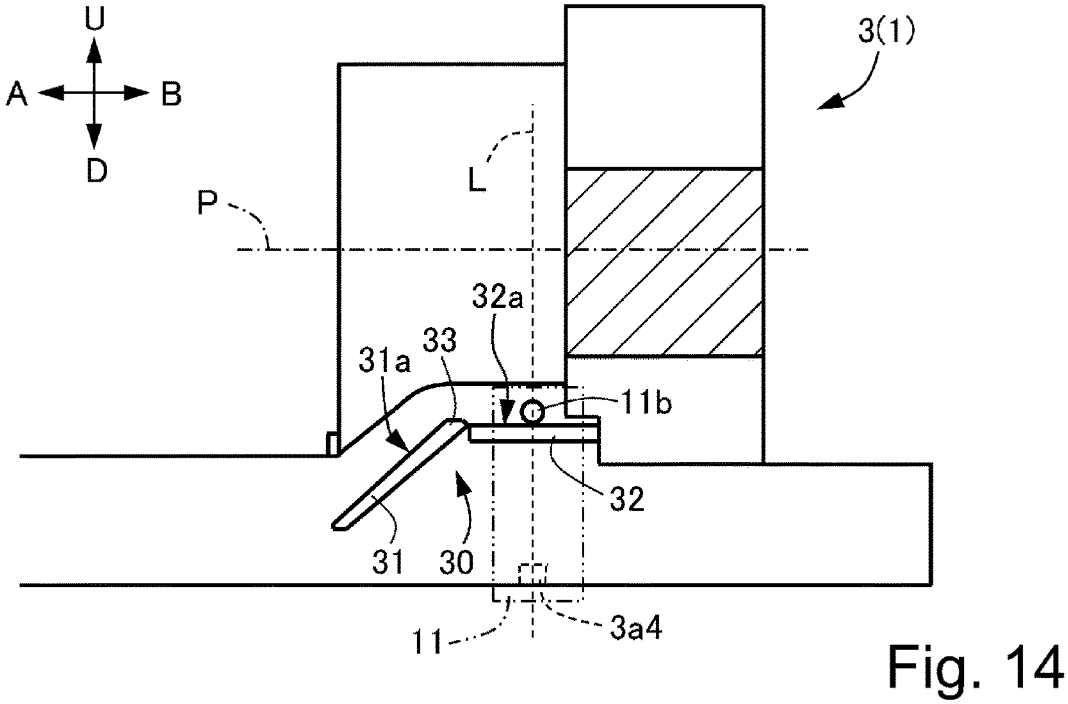

Part (a) of FIG. 14 is a side view of the engaging portion according to Embodiment 1 in a state in which the engaged portion (portion to be engaged) is located at the projecting portion of a third engaging surface, and part (b) of FIG. 14 is a side view of the state when the engaged portion is positioned on the second engaging surface as the mounting of the developer supply container is completed.

Figure 15:
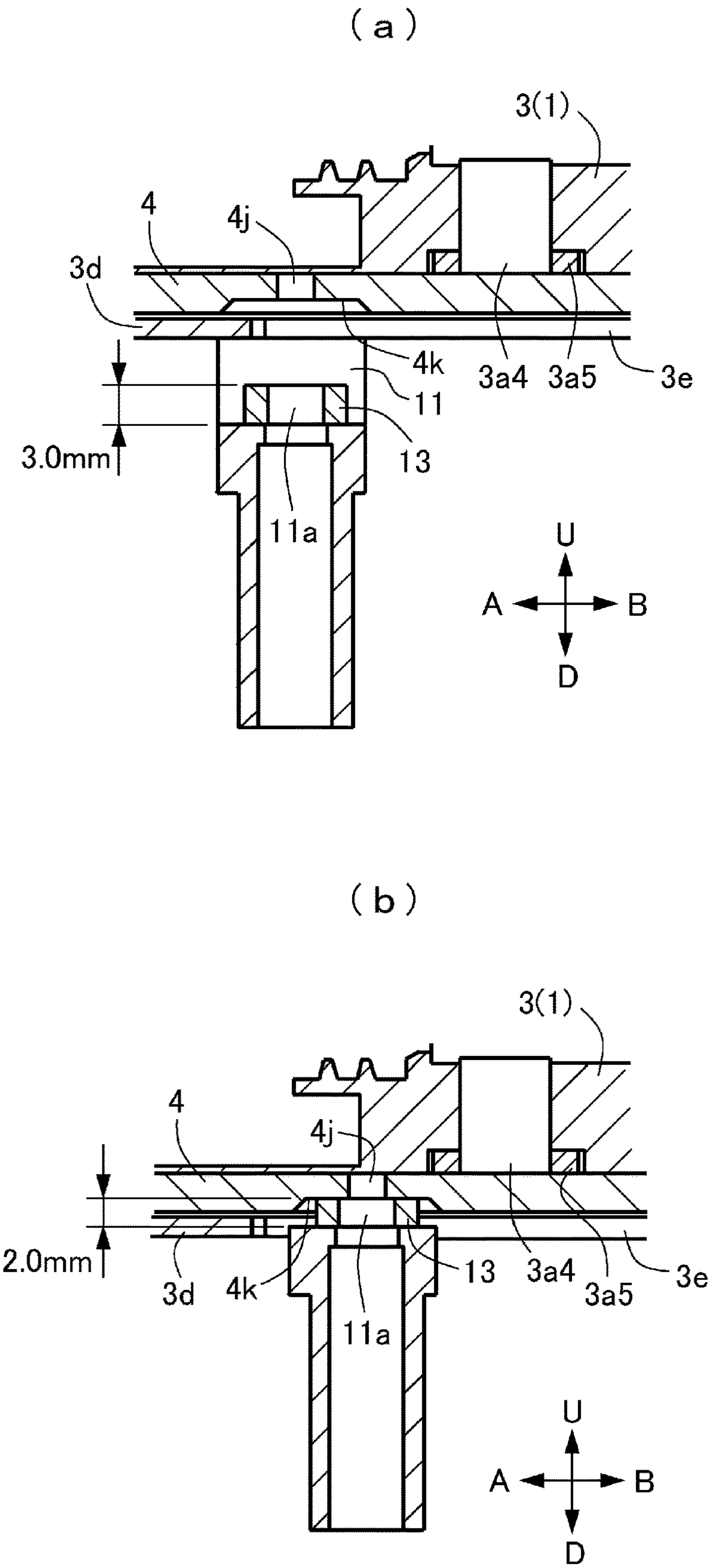

Part (a) of FIG. 15 is a sectional view in a state in which the engaged portion is engaged with the first engaging surface in accordance with the insertion of the developer supply container at the connecting portion between the shutter opening and the receiving opening, according to Embodiment 1, and part (b) of FIG. 15 is a sectional view of a state when the engaged portion is located at the upstream side end portion in the mounting direction of the first engaging surface.

Figure 16:
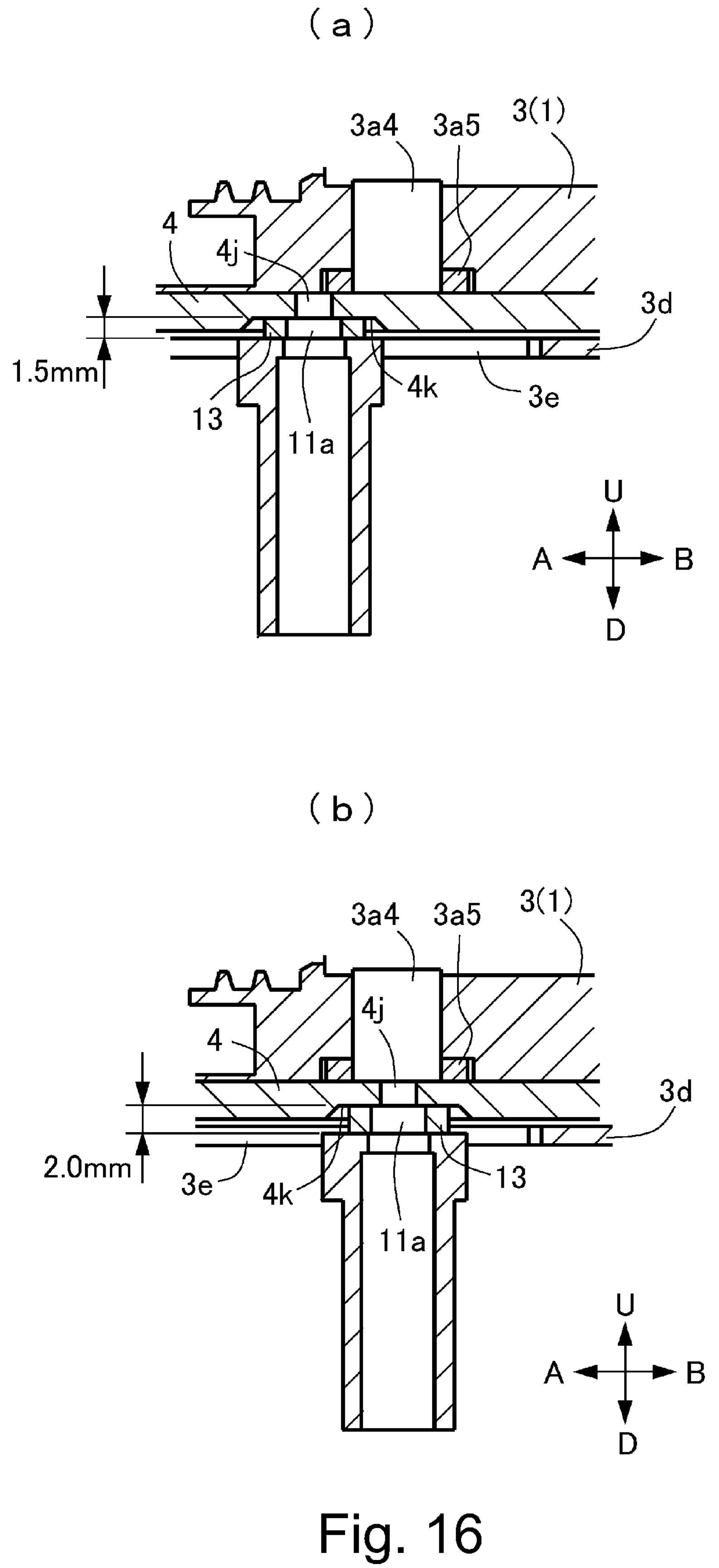

Part (a) of FIG. 16 is a cross-sectional view in a state that the engaged portion is positioned at the projecting portion of the third engaging surface at the connecting portion between the shutter opening and the receiving opening according to Embodiment 1, and part (b) of FIG. 16 is a cross-sectional view of the state when the engaged portion is positioned on the second engaging surface as the mounting of the developer supply container is completed.

Figure 17:
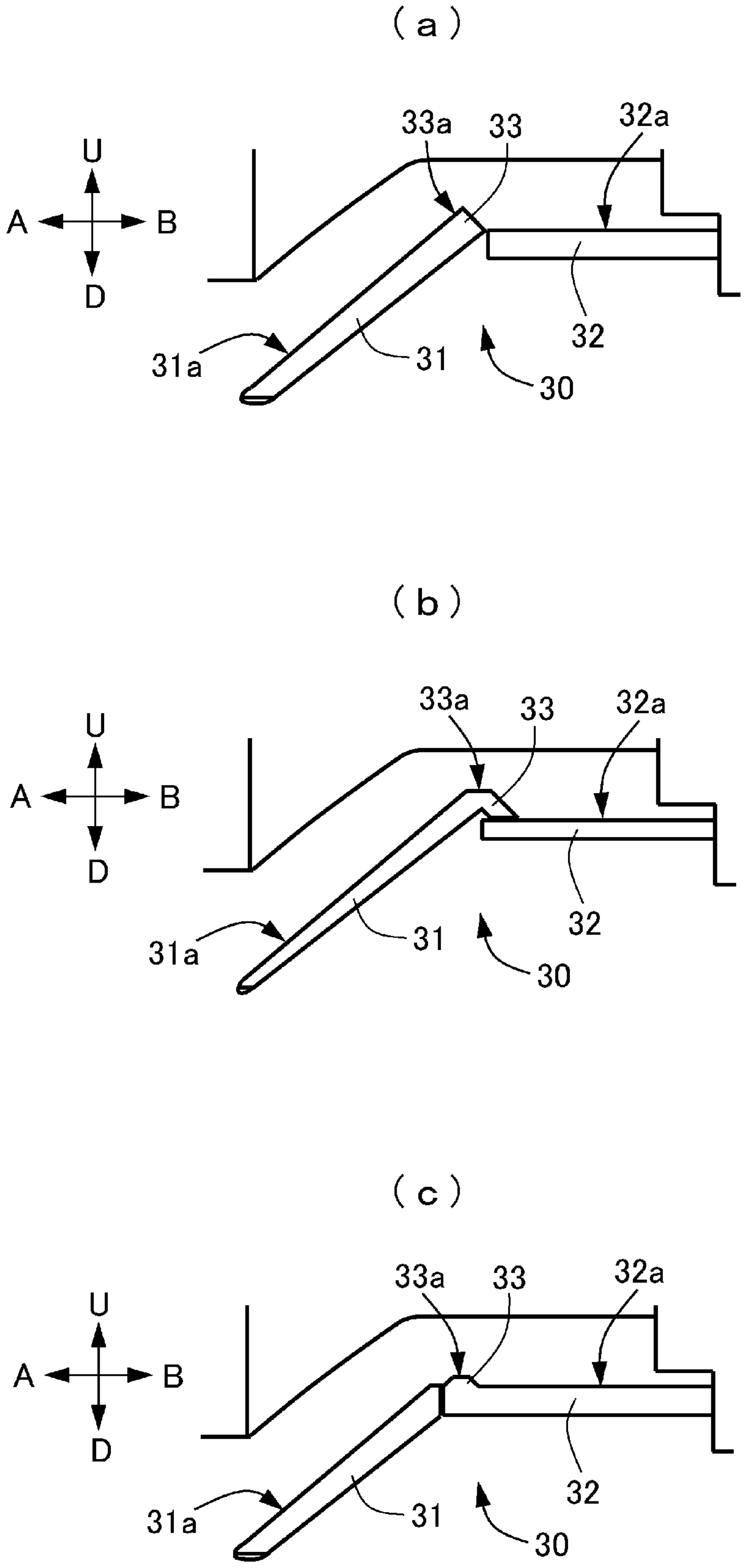

Part (a) of FIG. 17 is a side view of a first modified example of the engaging portion according to Embodiment 1; part (b) of FIG. 17 is a side view of a second modified example; and part (c) of FIG. 17 is a side view of a third modified example.

Figure 18:
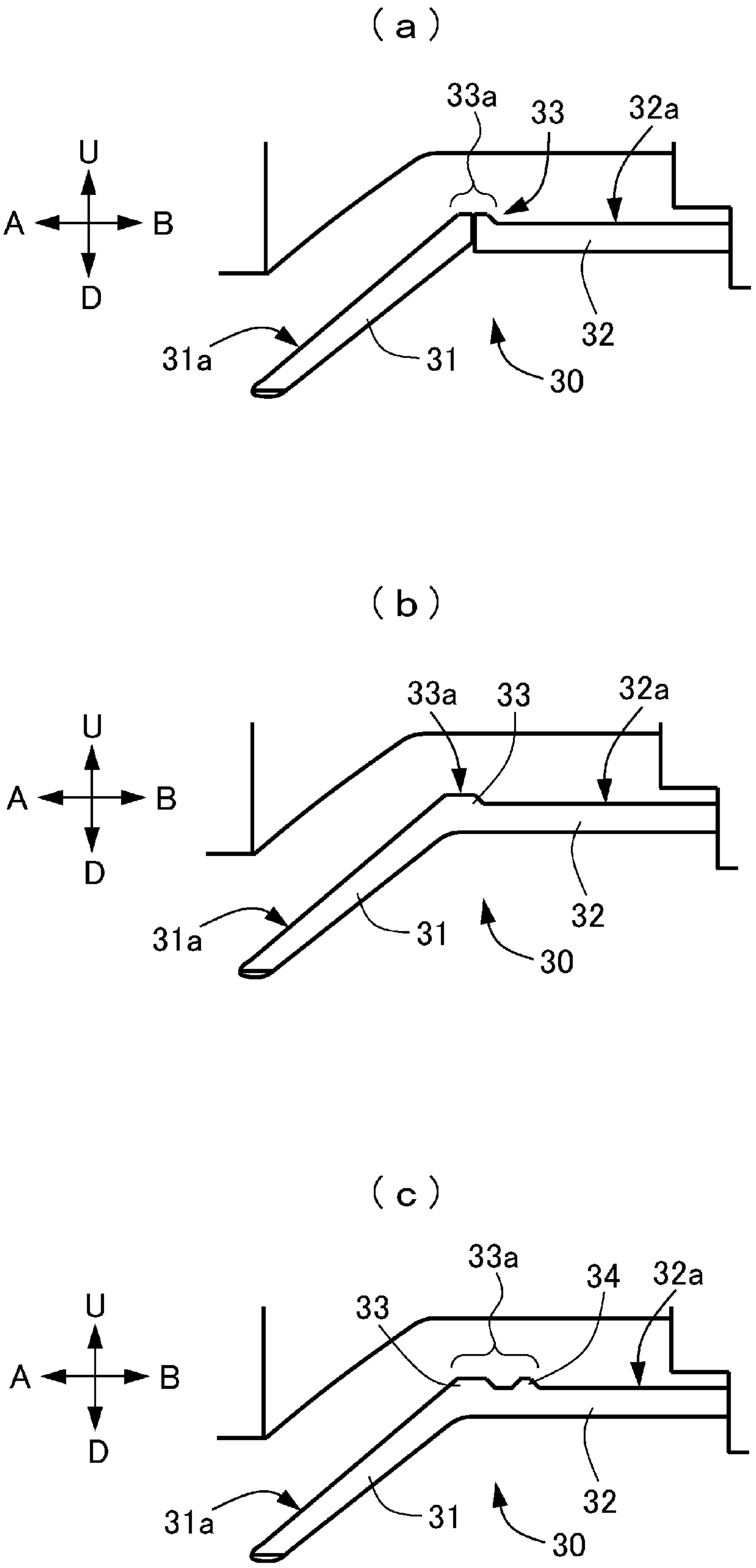

Part (a) of FIG. 18 is a side view of a fourth modified example of the engaging portion according to Embodiment 1; part (b) of FIG. 18 is a side view of a fifth modified example; and part (c) of FIG. 18 is a side view of a sixth modified example.

Figure 19:
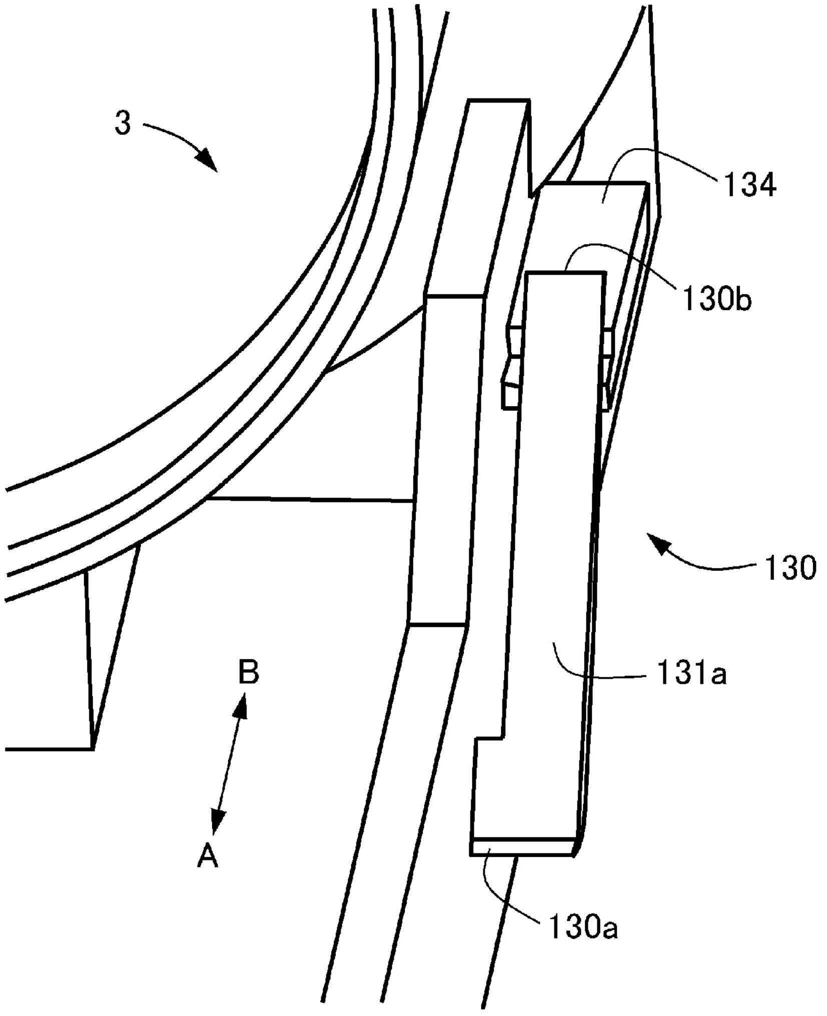

FIG. 19 is a perspective view of the engaging portion according to Embodiment 2.

Figure 20:
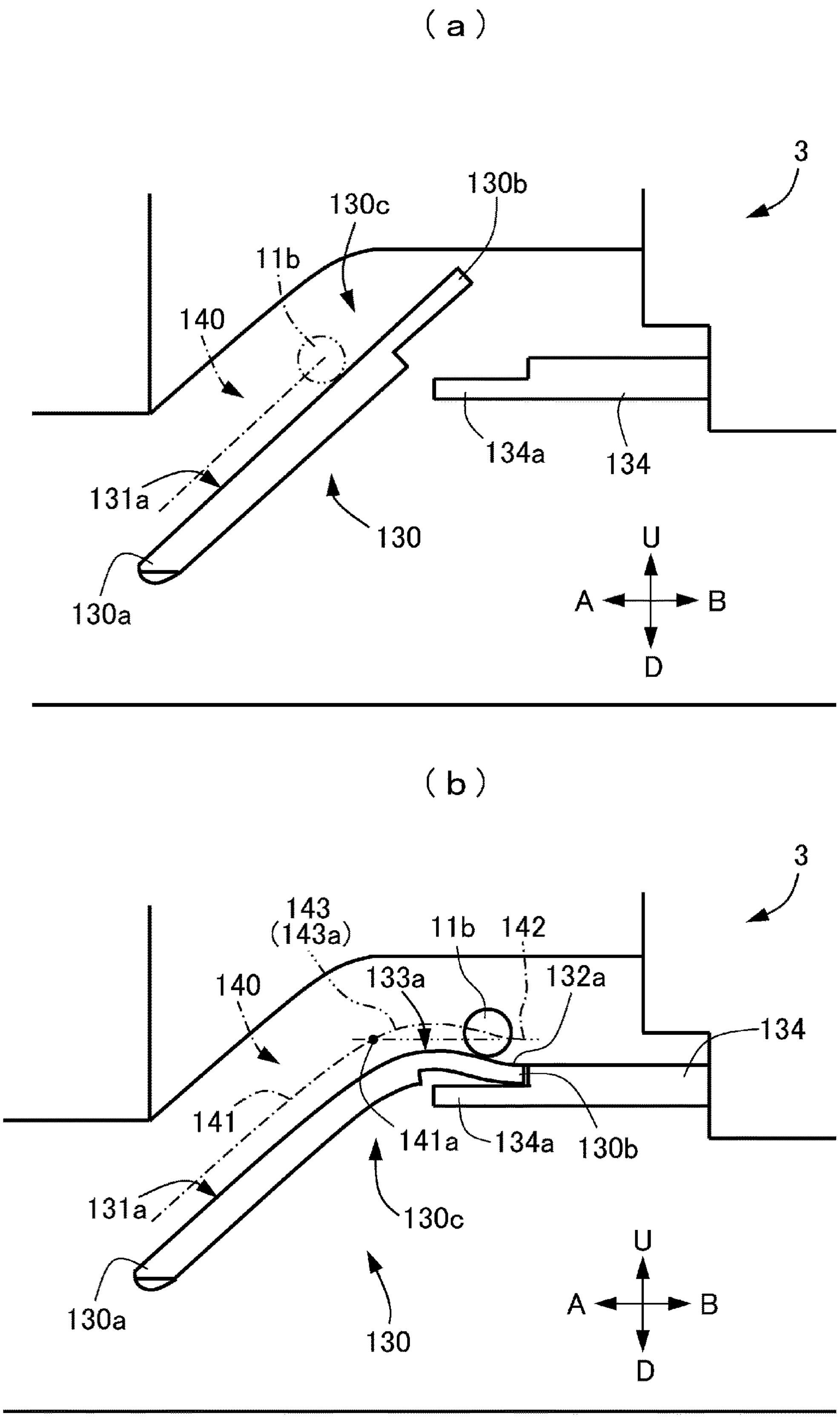

Part (a) of FIG. 20 is a side view in a state in which the engaged portion does not engage with the engaging portion in the engaging portion according to Embodiment 2, and part (b) of FIG. 20 is a side view in a state the engaging portion is elastically deformed by the engaged portion.

Figure 21:
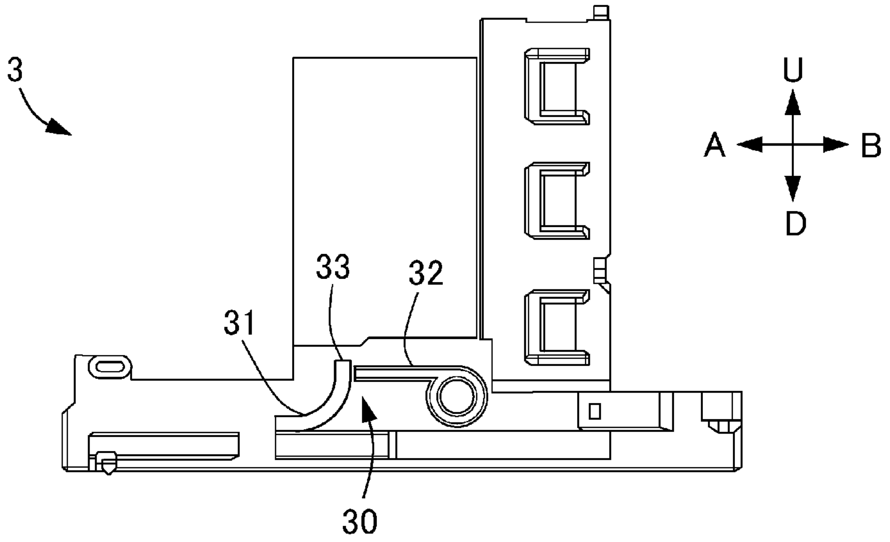
Figure 21:
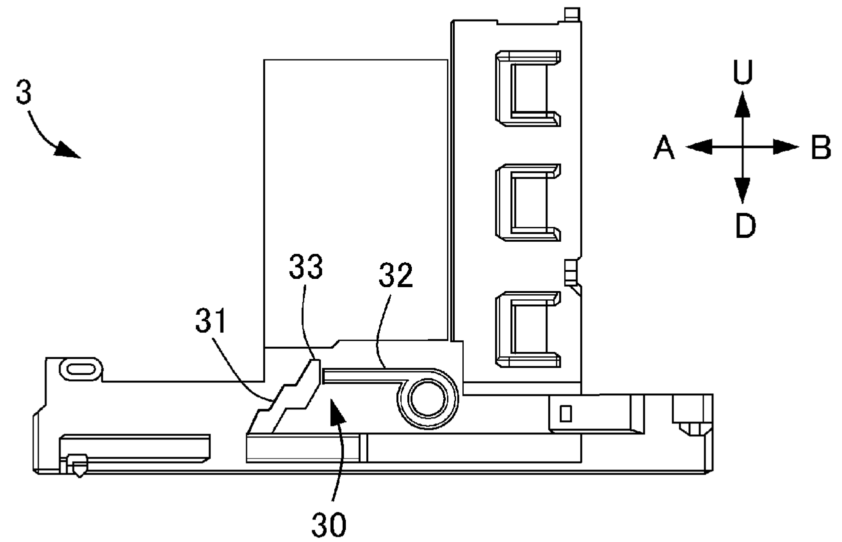

Part (a) of FIG. 21 is a side view of a modified example of the curved surface shape in the inclined portion according to Embodiment 2, and part (b) of FIG. 21 is a side view of a modification of the step shape.

DESCRIPTION OF THE EMBODIMENTS

Embodiment 1

In the following, referring to part (c) of FIGS. 1-18, Embodiment 1 of the present invention will be described. First, referring to FIG. 1 and FIG. 2, a schematic structure of the image forming apparatus of this embodiment will be described.

[Image Forming Apparatus]

Figure 1:
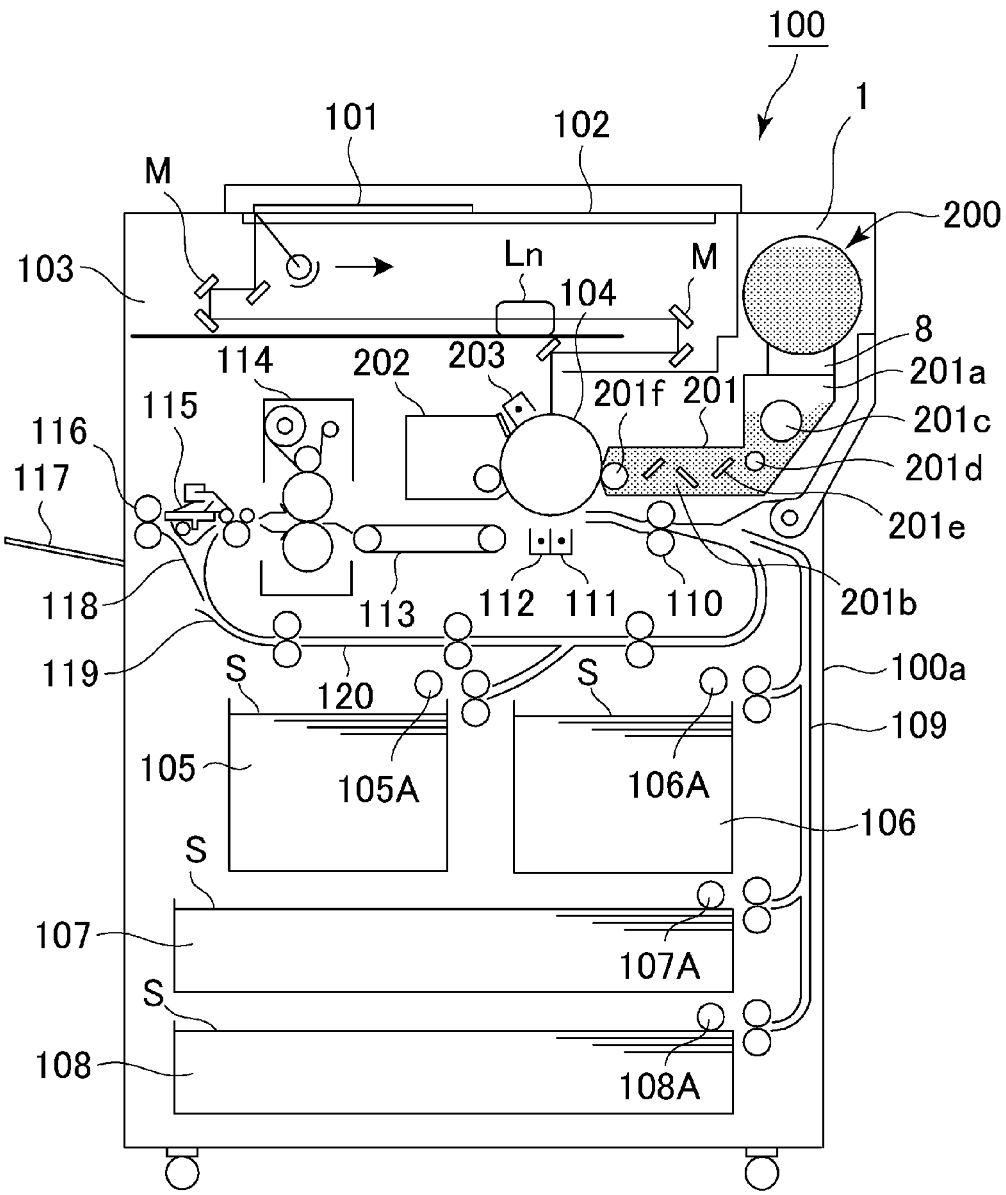
FIG. 1 shows a schematic structure diagram of an image forming apparatus according to Embodiment 1.

In FIG. 1, the image forming apparatus 100 includes an original reading device 103 at a top of a main assembly 100*a* of the image forming apparatus. An original 101 is placed on an original platen glass 102. A light image corresponding to image information of the original 101 is imaged, using a plurality of minors M and the lens Ln of the original reading device 103, on a photosensitive drum 104 which is a cylindrical photosensitive member as an image bearing member to form an electrostatic latent image. This electrostatic latent image is visualized using toner (one component magnetic toner) as a developer (dry powder) by a dry type developing device (one-component developing device) 201. Here, in this embodiment, a one-component magnetic toner is used as the developer to be supplied from the developer supply container 1 (also referred to as a toner cartridge), but the present invention is not limited to such an example, and it may be of a structure as will be described hereinafter.

More specifically, in the case of using a one-component developing device which performs developing operation with one component nonmagnetic toner, one component nonmagnetic toner is supplied as a developer. In addition, non-magnetic toner is supplied as the developer when using a two-component developer which develops the image using a two component developer prepared by mixing magnetic carrier and nonmagnetic toner. In this case, as the developer, a structure may be employed in which the magnetic carrier is also supplied together with the non-magnetic toner.

As described above, a developing device 201 shown in FIG. 1 develops the electrostatic latent image formed on the photosensitive drum 104 using the toner as the developer based on the image information of the original 101. In addition, a developer supplying system 200 is connected to developing machine 201, and the developer supplying system 200 includes a developer supply container 1 and a developer receiving apparatus 8 relative to which the developer supply container 1 is mountable and dismountable. Developer supplying system 200 will be described hereinafter.

The developing device 201 includes a developer hopper portion 201*a* and a developing roller 201*f*. In this developer hopper portion 201*a*, a stirring member 201*c* for stirring the developer supplied from the developer supply container 1 is provided. The developer stirred by the stirring member 201*c* is fed to a feeding member (201*e*) side by a feeding member 201*d*. And, the developer which has been sequentially fed by the feeding members 201*e* and 201*b* is carried on the developing roller 201*f* and finally supplied to a developing zone formed with the photosensitive drum 104. In this embodiment, a one-component developer is used, and therefore, toner as a developer from the developer supply container 1 is supplied to the developing device 201, but when using a two component developer, toner and carrier as a developer may be supplied from the developer supply container.

Cassettes 105 to 108 contain recording materials S such as sheets of paper. When an image is to be formed, a cassette containing an optimum recording material S among the sheets contained in these cassettes 105 to 108 is selected on the basis of the information inputted by the operator (user) on the operation portion 100*d* (FIG. 2) of the image forming apparatus 100 or on the basis of the size of the original 101. Here, as for the recording material S, it is not limited to sheets of paper, but it may be an OHP sheet or the like as the case may be. One sheet of recording material S fed by the feeding and separating devices 105A to 108A is fed to registration rollers 110 by way of a feeding portion 109. Then, the recording material S is fed in synchronization with the rotation of the photosensitive drum 104 and the scan timing of the original reading device 103.

A transfer charging device 111 and a separating charging device 112 are provided at positions opposing the photosensitive drum 104 on a downstream side of the registration roller 110 in the recording material feeding direction. The image of the developer (toner image) formed on the photosensitive drum 104 is transferred onto the recording material S fed by the registration roller 110, by a transfer charging device 111. And, the recording material S onto which the toner image is transferred is separated from the photosensitive drum 104 by a separation charging device 112. Subsequently, heat and pressure are applied to the recording material S fed by the feeding portion 113 in a fixing portion 114, so that the toner image is fixed on the recording material. Thereafter, the recording material S to which the toner image is fixed passes through a discharge/reversing portion 115 and is discharged to the discharge tray 117 by the discharge roller 116, in case of single-sided copy.

On the other hand, in case of double-sided copy, the recording material S passes through the discharge/reversing portion 115, and the recording material S is partly discharged to the outside of the apparatus once by the discharge roller 116. After this, at the timing when a trailing end of the recording material S passes through the switching member 118 and is still nipped by the discharge rollers 116, the position of the switching member 118 is switched, and the discharge roller 116 is rotated counterclockwise, by which the recording material S is fed again into the apparatus. Thereafter, the recording material S is fed to the registration roller 110 by way of the re-feeding and feeding portions 119 and 120, and is discharged to the discharge tray 117 by way of the same path as in the case of single-sided copying.

In the image forming apparatus 100 having the above-described structure, image forming process devices such as a developing device 201, a cleaner portion 202, a primary charging device 203 and the like are provided around the photosensitive drum 104. Here, the developing device 201 supplies the developer to the electrostatic latent image formed on the photosensitive drum 104 on the basis of the image information of the original 101 read by the original reading device 103 so as to develop the electrostatic latent image. In addition, the primary charging device 203 uniformly charges the surface of the photosensitive drum to form a desired electrostatic latent image on the photosensitive drum 104. Furthermore, the cleaner portion 202 has a function of removing the developer remaining on the photosensitive drum 104.

Figure 2:
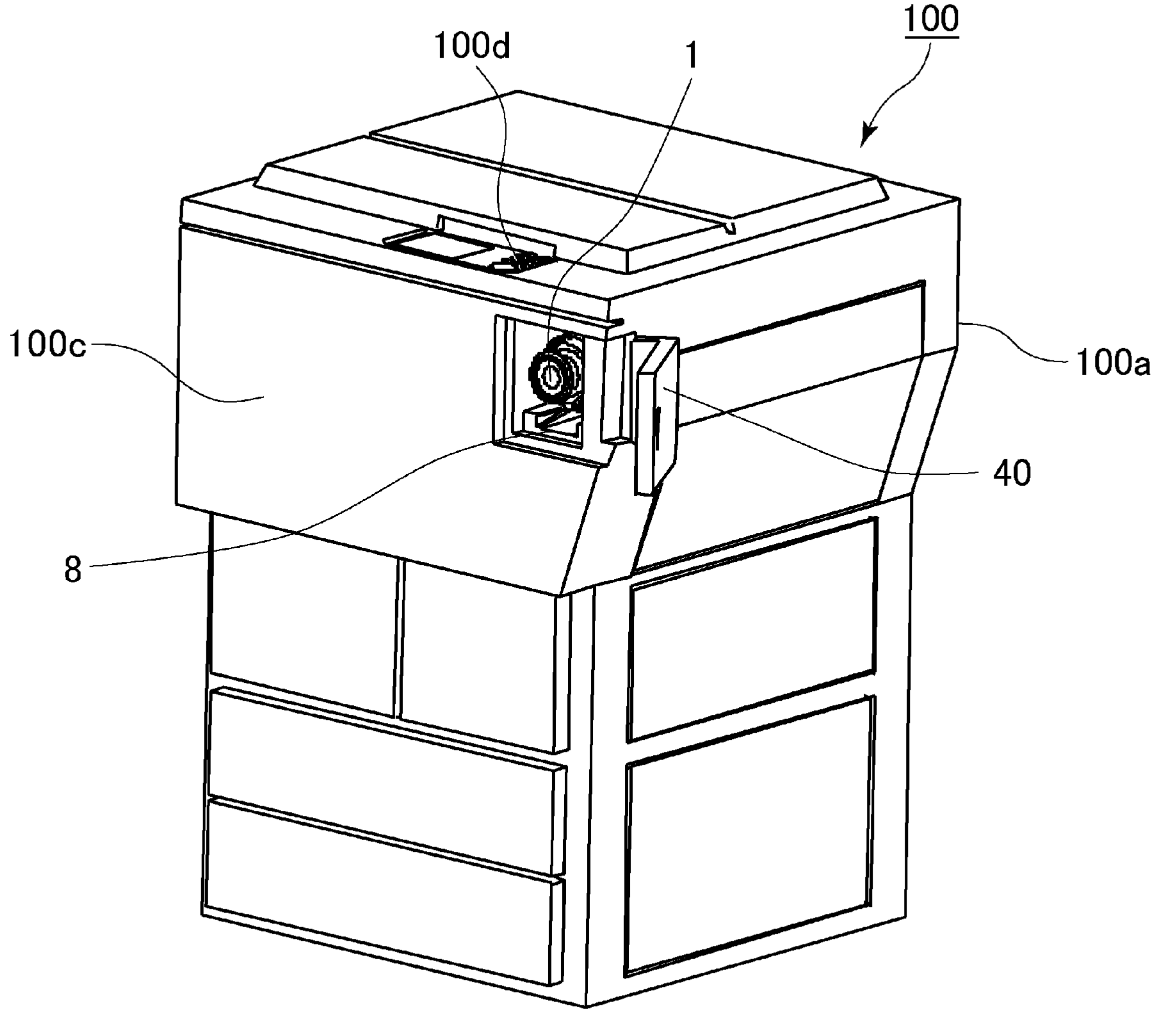
FIG. 2 is a perspective view of the image forming apparatus according to Embodiment 1.

As shown in FIG. 2, when the operator opens a replacement cover 40 which is a portion of an outer cover of the apparatus main assembly 100*a* of the image forming apparatus 100, a part of the developer receiving apparatus 8 which will be described hereinafter can be seen. And, by inserting the developer supply container 1 into this developer receiving apparatus 8, the developer supply container 1 is mounted in a state where it can supply the developer to the developer receiving apparatus 8. On the other hand, when the operator exchanges the developer supply container 1, it carries out the operation opposite to the loading operation, by which the developer supply container 1 is dismounted from the developer receiving apparatus 8, and thereafter a new developer supply container 1 can be mounted. Here, the replacement cover 40 is a cover exclusively for mounting/dismounting (exchanging) the developer supply container 1, and is opened and closed only for dismounting/mounting the developer supply container 1. On the other hand, the maintenance operation for the image forming apparatus 100 is performed by opening/closing a front cover 100*c*. Here, the replacement cover 40 and the front cover 100*c* may be integrated. In such a case, the replacement of the developer supply container 1 and the maintenance of the image forming apparatus 100 are performed by opening and closing the integrated cover (not shown).

[Developer Receiving Apparatus]

Next, referring to part (a) of FIG. 3 to part (c) of FIG. 4, the developer receiving apparatus 8 constituting the developer supplying system 200 will be described. As shown in part (a) of FIG. 3, the developer receiving apparatus 8 is provided with a mounting portion (mounting space) 8*f* to which the developer supply container 1 is dismountably mounted. The mounting portion 8*f* is provided with an insertion guide 8*e* for guiding the developer supply container 1 in the mounting and dismounting directions. In the case of this embodiment, the structure is such that the dismounting direction B of the developer supply container 1 is opposite to the direction A of mounting the developer supply container 1 by the insertion guide 8*e*.

As shown in part (a) of FIG. 3 to part (a) of FIG. 4, the developer receiving apparatus 8 has a drive gear 9 which functions as a driving mechanism for driving the developer supply container 1. A rotational driving force is transmitted to the actuating gear 9 from a driving motor 500 by way of a driving gear train (not shown), so that the actuating gear 9 applies the rotational driving force to the developer supply container 1 mounted in the mounting portion 8*f*. The operation of the drive motor 500 is controlled by the control device 600.

In addition to controlling the driving motor 500, the control device 600 controls overall of the image forming apparatus 100. The control device 600 has a CPU (Central Processing Unit), a ROM (Read Only Memory), and a RAM (Random Access Memory). The CPU controls each portion while reading the program corresponding to a control procedure stored in the ROM. In addition, working data and an input data are stored in the RAM, and the CPU executes control while looking up the data stored in the RAM on the basis of the program etc.

In the mounting portion 8*f* of the developer receiving apparatus 8, there is provided a developer receiving portion 11 for receiving the developer discharged out of the developer supply container 1. The developer receiving portion 11 is connected to a container discharge opening 3*a*4 (part (b) of FIG. 16) of the developer supply container 1 when the developer supply container 1 is mounted, and has a receiving opening 11*a* for receiving the developer discharged through the container discharge opening 3*a*4. The developer receiving portion 11 is mounted so as to be movable (displaceable) in the direction in which the receiving opening 11*a* moves toward and away from the container discharge opening 3*a*4 (in this embodiment, the direction crossing with the direction A in which the developer supply container 1 is mounted (more specifically, vertical direction relative to the developer receiving apparatus 8)). As shown in part (b) of FIG. 3, in the case of this embodiment, the developer receiving portion 11 is urged by an urging member (urging portion) 12, including a helical compression coil spring, for example, in such a direction that the receiving opening 11*a* moves away from the container discharge opening 3*a*4 (vertically downward, reverse direction to a direction of displacement). Therefore, the developer receiving portion 11 moves against the urging force of the urging member 12 when the receiving opening 11*a* moves toward the container discharge opening 3*a*4 (upward in the vertical direction). Here, in the present specification, the direction in which the developer receiving portion 11 displaces in accordance with the mounting operation of the developer supply container 1 is an upward direction in the vertical direction. This direction is called upward (displacing direction) U, and the downward vertical direction in the opposite direction is called the downward direction D.

In addition, as shown in part (a) of FIG. 4, in the mounting portion 8*f* of the developer receiving apparatus 8, a first shutter stopper portion 8*a* and a second shutter stopper portion 8*b* are provided on the upstream side of the developer receiving portion 11 in the mounting direction A. In the developer supply container 1 which is moving relative to the developer receiving apparatus 8 during mounting/dismounting, the first and second shutter stopper portions 8*a* and 8*b* regulate the relative movement of the shutter 4 (part (b) of FIG. 5) which will be described hereinafter relative to the developer receiving apparatus 8. In this case, the shutter 4 moves relative to a part of the developer supply container 1 other than the shutter 4, such as the container main body 2 described hereinafter.

As shown in part (b) of FIG. 3 and part (b) of FIG. 4, below, in the downward direction D, of the developer receiving apparatus 8, there is provided a sub-hopper 8*c* for temporarily storing the developer supplied from the developer supply container 1. Inside the sub-hopper 8*c*, there are provided a feeding screw 14 for feeding the developer to the developer hopper portion 201*a* (FIG. 1) which is a portion of the developing device 201, and an opening 8*d* communicating with the developer hopper portion 201*a*.

As shown in part (c) of FIG. 4, the developer receiving portion 11 is provided with a main assembly seal (sealing member) 13 formed so as to surround the receiving opening 11*a*. The main assembly seal 13 is made of elastic material, foam or the like. In this embodiment, the thickness when no load acts on the main assembly seal 13 is 3.0 mm (part (a) in FIG. 15). As shown in part (b) of FIG. 16, in the state that the developer supply container 1 is mounted, the main assembly seal 13 is in close contact with an opening seal 3*a*5 surrounding the container discharge opening 3*a*4 of the developer supply container 1, with the shutter 4 described hereinafter sandwiched therebetween. By this, the developer discharged through the container discharge opening 3*a*4 of the developer supply container 1 to the receiving opening 11*a* by way of the shutter opening (discharge port) 4*j* of the shutter 4 does not leak out of the receiving opening 11*a* which is a part of the developer feeding passage. That is, the main assembly seal 13 is provided around the receiving opening 11*a*, and when the communication between the receiving opening 11*a* and the shutter opening 4*j* is established, the sealing is performed by elastic deformation between the receiving opening 11*a* and the shutter opening 4*j*.

Here, it is desirable that a diameter of the receiving opening 11*a* is substantially the same as or slightly larger than a diameter of the shutter opening 4*j* of the shutter 4, in order to prevent the interior of the mounting portion 8*f* from being contaminated by the developer. This is because if the diameter of the receiving opening 11*a* is smaller than the diameter of the shutter opening 4*j*, the developer discharged from the shutter opening 4*j* is more likely to be deposited on the upper surface of the main assembly seal 13. If the developer is deposited on the lower surface of the developer supply container 1 at the time of mounting/dismounting operation of the developer supply container 1, it becomes a cause of contamination by the developer. In view of this point, it is preferable that the diameter of the receiving opening 11*a* is roughly the same as or about 2 mm larger than the diameter of the shutter opening 4*j*. For example, in the case that the diameter of the shutter opening 4*j* of the shutter 4 is a fine hole (pinhole) of about 2 mm in diameter, it is preferable that the diameter of the receiving opening 11*a* is about 3 mm.

In addition, as shown in part (c) of FIG. 4, on the side surface of the developer receiving portion 11, an engaged portion (portion to be engaged) 11*b* projecting toward the center side is provided. In the case of this embodiment, the engaged portion 11*b* is directly engaged with the engaging portion 30 (part (a) in FIG. 7) provided in the developer supply container 1 which will be described hereinafter, and is guided by the engaging portion 30, by which the developer receiving portion 11 is lifted toward the developer supply container 1 in the upward direction U.

[Developer Supply Container]

Next, referring to part (a) FIG. 5 to part (b) of FIG. 12, the developer supply container 1 constituting the developer supplying system 200 will be described. First, referring to part (a) of FIG. 5 and part (b) of FIG. 5, the overall structure of the developer supply container 1 will be described. The developer supply container 1 mainly includes the container main body 2, a flange portion 3, the shutter 4, a pump portion 5, a reciprocating member 6, and a cover 7. The container body 2 supplies the developer to the developer receiving apparatus 8 by rotating in the developer receiving apparatus 8 in the direction indicated by an arrow R about the rotation axis P shown in part (a) of FIG. 5. In the following, each element constituting the developer supply container 1 will be described in detail. In this embodiment, the direction of the rotation axis P is the rotation axis direction, and is the same direction as the mounting/dismounting direction parallel to the inserting direction A and the removing direction B.

[Container Body]

As shown in FIG. 6, the container main body 2 mainly comprises a developer accommodating portion 2*c* for containing the developer. In addition, the container main body 2 is provided with a helical feeding groove 2*a* (feeding portion) for feeding the developer in the developer accommodating portion 2*c* by rotating the container main body 2 in the direction of the arrow R around the rotation axis P. That is, the developer accommodating portion 2*c* is rotatable relative to the discharge portion 300. In addition, a cam groove 2*b* and a drive receiving portion 2*d* for receiving a driving force from the main assembly side are integrally formed over the entire periphery of the outer circumferential surface of the container main body 2 on one end side. Here, in this embodiment, the cam groove 2*b* and the drive receiving portion (gear) 2*d* are integrally formed with the container body 2, but the cam groove 2*b* or the drive receiving portion 2*d* may be formed as a separate member and may be integrally mounted to the container body 2. In addition, in this embodiment, for example, a toner including a volume average particle diameter of 5 μm to 6 μm is accommodated in the developer accommodating portion 2*c* as the developer. In addition, in this embodiment, the developer accommodating portion 2*c* includes not only the container main body 2 but also the interior spaces of the flange portion 3 and the pump portion 5 which will be described hereinafter.

[Flange Portion]

Referring to part (a) of FIG. 5, part (b) of FIG. 5, part (a) of FIG. 7 and part (b) of FIG. 7, the flange portion 3 will be described. The flange portion 3 is mounted so as to be rotatable relative to the container body 2 about the rotation axis P. And, when the developer supply container 1 is mounted to the developer receiving apparatus 8, the flange portion 3 is held so as not to rotate in the arrow R direction relative to the mounting portion 8*f* (part (a) of FIG. 3). In addition, as shown in part (b) of FIG. 7, a container discharge opening 3*a*4 is provided in a portion of the flange portion 3, and an opening seal 3*a*5 is mounted to the periphery thereof. As shown in part (b) of FIG. 5, the flange portion 3 is provided with the pump portion 5, the reciprocating member 6, the shutter 4, and the cover 7.

First, the pump portion 5 is threaded at one end side (mounting direction A) of the flange portion 3, and the container body 2 is connected to the other end side (side in the dismounting direction B) with a sealing member (not shown) therebetween. In addition, a reciprocating member 6 is provided so as to sandwich the pump portion 5, and the engaging projection 6*b* (parts (a) and (b) of FIG. 11) provided on the reciprocating member 6 is engaged with the cam groove 2*b* (FIG. 6). The flange portion 3 is provided with the shutter 4. In this embodiment, the flange portion 3 and the shutter 4 constitute a discharge portion 300 for discharging the developer accommodated in the developer accommodating portion 2*c* out. In addition, the surface on which the shutter 4 is provided is the bottom side of the flange portion 3, more particularly, the top surface of the bottom portion 3*d*. In order to improve an outer appearance and to protect the reciprocating member 6 and pump portion 5, the cover 7 is integrally assembled so as to cover the whole of the flange portion 3, the shutter 4, the pump portion 5, and the reciprocating member 6 as shown in parts (a) and (b) of FIG. 5.

In addition, as shown in parts (a) and (b) of FIG. 7, the flange portion 3 has a flat bottom portion 3*d* provided horizontally and an opening portion 3*e* formed in a substantially central portion of the bottom portion 3*d*, the opening portion 3*e* penetrating in a vertical direction. As shown in part (b) of FIG. 5, the bottom portion 3*d* slidably supports the shutter 4 at the lower portion. As shown in part (b) of FIG. 15 through part (b) of FIG. 16, when the main assembly seal 13 and the receiving opening 11*a* of the developer receiving portion 11 are displaced in the upward direction U, they pass through the opening portion 3*e*.

[Engaging Portion]

As shown in part (a) of FIG. 7, a flange portion 3 has an engaging portion 30 engageable with the engaged portion (portion to be engaged) 11*b* (part (a) of FIG. 3) of the developer receiving portion 11. The engaging portion 30 engages with the engaged portion 11*b* with the mounting operation of the developer supply container 1 to displace the developer receiving portion 11 in the upward direction U, so that the receiving opening 11*a* comes into fluid communication with the shutter opening 4*j* (part (b) of FIG. 16). At this time, the developer supply container 1 and the developer receiving portion 11 are in a state that the developer supply from the developer supply container 1 to the developer receiving portion 11 is possible (a state in which the developer supply container 1 and the developer receiving portion 11 are connected to each other). In addition, the engaging portion 30 guides the developer receiving portion 11 so as to be displaced in the downward direction D apart from the developer supply container 1 along with the removal operation of the developer supply container 1, so that the connection state between the developer supply container 1 and the developer receiving portion 11 is ceased. Here, as shown in parts (a) and (b) of FIG. 7, in this embodiment, the engaging portion 30 is provided on each lateral sides with respect to the widthwise direction which is perpendicular to the direction of insertion and removal of the flange portion 3 and perpendicular to the vertical direction.

As shown in part (a) of FIG. 7 and FIG. 8, the engaging portion 30 has an inclined portion 31 and a parallel portion 32. In this embodiment, the inclined portion 31 and the parallel portion 32 are formed separately from the flange portion 3 and is integrated with the flange portion 3 by adhesion or the like. Part (c) of FIG. 5 is a front view of the developer supply container 1. As shown in part (c) of FIG. 5, the engaging portion 30 is disposed below a plane H including the rotation axis P. Also, the plane H including the rotation axis P is a horizontal plane, and the engaging portion 30 is disposed below this horizontal plane. Here, the inclined portion 31 and the parallel portion 32 and the flange portion 3 may be integrally formed by injection molding or the like. A first engaging surface 31*a* and a third engaging surface 33*a* are formed on the inclined portion 31. A second engaging surface 32*a* is formed on the parallel portion 32. Although details will be described hereinafter, the engaging portion of this embodiment has the following structure. The inclined portion (first portion) 31 and the parallel portion (second portion) 32 extending from the lower end (the first position) toward the upper end (the second position) constitute the tracks where the engaged portion 11*b* passes. And, as shown in part (c) of FIG. 5, the track is arranged below the plane H. Also, when the plane including the rotation axis is imagined, the discharge opening and the track are provided in the same region (lower region). In such a case, the parallel portion 32 is disposed at a position closer to the horizontal plane H or the imaginary plane than the inclined portion 31. Also, in this embodiment, in the developer receiving portion 11, the engaged portion 11*b* and the receiving opening are on the same plane perpendicular to the rotation axis P. As a result, the engaged portion 11*b* and the parallel portion 32 are on the same plane perpendicular to the rotation axis P. The engaged portion 11*b* is engaged with this track, and the engaged portion 11*b* is lifted so that the discharge opening and the receiving opening can communicate with each other. And, when the communication path is formed, a discharge path is formed between the inside of the developer supply container and the discharge opening so that the developer in the developer supply container can be discharged toward the receiving port.

The first engaging surface 31*a* is in a range from the lowermost portion to the upstream side end portion 31*b* of the upper surface of the inclined portion 31 and is provided so as to be directed upwardly U as going to upstream side in the mounting direction A. That is, the first engaging surface 31*a* is provided so as to be upward in the vertical direction toward the developer accommodating portion 2*c* of the developer supply container 1. In this embodiment, the first engaging surface 31*a* has an inclined planar shape. The upstream side end portion (the end portion on the developer accommodating portion 2*c* side) 31*b* of the first engaging surface 31*a* in the mounting direction A is formed so that the developer receiving portion 11 is displaced by which the main assembly seal 13 is pressed around the shutter opening 4*j* (part (b) of FIG. 15). With the inserting/removing operation of the developer supply container 1 relative to the developer receiving device 8, the first engaging surface 31*a* guides the engaged portion 11*b* so as to displace the developer receiving portion 11 in a direction toward and away from the developer supply container 1. In addition, in the direction of the rotation axis P, the inclined portion 31 has a shape to be upward as approaching to the drive receiving portion 2*d*. Here, in this embodiment, the inclined portion 31 has a linear shape. The inclination angle of the inclined portion 31 relative to the mounting/dismounting direction of the developer supply container 1 is desirably 10 to 50 degrees. In this embodiment, the angle is approx. 40 degrees. However, the shape of the inclined portion 31 is not limited to that of this embodiment as long as it is a shape extending upward as approaching to the drive receiving portion 2*d*. For example, the shape of the inclined portion 31 may be a shape of an inclined surface including a curved surface shape as shown in part (a) of FIG. 21. Or, it may have a stepped shape including a parallel surface and an inclined surface as shown in part (b) of FIG. 21.

The second engaging surface 32*a* is disposed on the upstream side of the first engaging surface 31*a* in the mounting direction A and is an upper surface of the parallel portion 32 and further is a parallel surface provided substantially parallel to the mounting direction A. The second engaging surface 32*a* is provided closer the side of the developer accommodating portion 2*c* than the first engaging surface 31*a*, and it engages with the engaged portion 11*b* when the receiving opening 11*a* communicates with the shutter opening 4*j*. The second engaging surface 32*a* is provided at the same height (position) as the height (position) of the upstream side end portion 31*b* in the mounting direction A of the first engaging surface 31*a*. The second engaging surface 32*a* has a function of maintaining a state that the container discharge opening 3*a*4 and the receiving opening 11*a* of the developer receiving portion 11 communicate with each other in a constant positional relationship (part (b) of FIG. 16) in the case where the developer supply container 1 is inserted into and removed out of the developer receiving device 8. In the first engaging surface 31*a* and the second engaging surface 32*a*, the position of the end portion of the first engaging surface 31*a* on the side of the developer accommodating portion 2*c* in the vertical direction is higher than the of the second engaging surface 32*a*.

The third engaging surface 33*a* is provided continuously with the upstream side end portion 31*b*, in the mounting direction A, of the first engaging surface 31*a* in the inclined portion 31 of the upper surface of the inclined portion 31, and it has only one projecting portion 33 which projects in the upward direction U beyond the second engaging surface 32*a*. That is, the first engaging surface 31*a* and the third engaging surface 33*a* are continuous and are integrally molded. In this embodiment, the third engaging surface 33*a* has a surface formed on the upper portion of the projecting portion 33 and parallel to the inserting/removing direction. That is, the second engaging surface 32*a* and the third engaging surface 33*a* are substantially parallel with each other. The third engaging surface 33*a* is provided so as to continuously guide the engaged portion 11*b* between the first engaging surface 31*a* and the second engaging surface 32*a*. The upper end portion of the projecting portion 33 of the third engaging surface 33*a* passes over the upstream side end portion 31*b*, in the mounting direction A, of the first engaging surface 31*a* and over the second engaging surface 32*a* in the upward direction U, and extends in the upward direction U by the distance L1. That is, the third engaging surface 33*a* is provided between the first engaging surface 31*a* and the second engaging surface 32*a* in the direction of the rotation axis P of the developer accommodating portion 2*c*, and is higher than the second engaging surface 32*a* in the vertical direction. Therefore, when the third engaging surface 33*a* guides the engaged portion 11*b* in the process of inserting the developer supply container 1 into the developer receiving device 8, the operation is as follows. That is, in this process, the developer receiving portion 11 is displaced upward U (closer to the developer supply container 1) by the distance L1 than the position at which the engaging portion 30 maintains the developer receiving portion 11 (the height of the second engaging surface 32*a*), by the third engaging surface 33*a*.

[Shutter]

Next, referring to parts (a) and (b) of FIG. 9 the shutter 4 will be described. The shutter 4 slidable on the upper surface of the bottom portion 3*d* (part (a) of FIG. 7) of the flange portion 3 move relative to a portion (flange portion 3) of the developer supply container 1. The shutter 4 has a shutter opening 4*j* as a discharge opening, and opens and closes the container discharge opening 3*a*4 (part (b) in FIG. 7) of the developer supply container 1 in accordance with the mounting and dismounting operation of the developer supply container 1. That is, by moving the shutter 4 relative to the developer supply container 1 in accordance with the mounting operation of the developer supply container 1, the receiving opening 11*a* of the developer receiving portion 11 and the shutter opening 4*j* communicate with each other, and in addition with the container discharge opening 3*a*4. By this, the developer in the developer supply container 1 can be discharged to the receiving opening 11*a*. That is, the discharge portion 300 (part (b) of FIG. 5) for discharging the developer is constituted by the flange portion 3 and the shutter 4, and the shutter 4 of the discharge portion 300 is provided at the bottom with the shutter opening 4*j* as the discharge opening for discharging the developer.

In addition, the shutter 4 is provided with a connecting surface 4*k* connected to the developer receiving portion 11 so as to surround the shutter opening 4*j*, on the sliding surface 4*i* opposite to the bottom portion 3*d* (part (a) of FIG. 15). The connecting surface 4*k* has a larger diameter than the shutter opening 4*j* and is parallel to the sliding surface 4*i*. After mounting the developer supply container 1, the upper end surface of the main assembly seal 13 is brought into close contact with the connecting surface 4*k* (part (b) of FIG. 16).

On the other hand, as shown in parts (a) and (b) of FIG. 9, a developer sealing portion 4*a* is provided at a position deviated from the shutter opening 4*j* of the shutter 4. The developer sealing portion 4*a* closes the container discharge opening 3*a*4, and as the shutter 4 moves relative to the developer supply container 1 in accordance with the operation of taking out the developer supply container 1. In addition, the developer sealing portion 4*a* prevents leakage of the developer from the container discharge opening 3*a*4, when the developer supply container 1 is not mounted to the mounting portion 8*f* (part (a) of FIG. 3) of the developer receiving apparatus 8. A sliding surface 4*i* sliding on the upper surface of the bottom portion 3*d* of the flange portion 3 is provided on a back surface side (the developer receiving portion 11 side) of the developer sealing portion 4*a*. Here, the shutter 4 is engaged with the flange portion 3 in an attitude in which the developer sealing portion 4*a* faces upward.

The shutter 4 is provided with a first stopper portion 4*b* and a second stopper portion 4*c* held by first and second shutter stopper portions 8*a* and 8*b* (part (a) of FIG. 4) of the developer receiving apparatus 8 doing so that the developer supply container 1 is capable of moving relative to the shutter 4. In addition, the shutter 4 is provided with a support portion 4*d* for displaceably supporting the first and second stopper portions 4*b* and 4*c*. The support portion 4*d* is elastically deformable and extends from one side to other side of the developer sealing portion 4*a*. And, the first stopper portion 4*b* and the second stopper portion 4*c* are provided at the free end portion of the support portion 4*d*. By this, the first and second stopper portions 4*b*, 4*c* can be displaced by the elasticity of the support portion 4*d*.

Here, the first stopper portion 4*b* is inclined so that an angle $\alpha$ formed by the first stopper portion 4*b* and the support portion 4*d* is an acute angle. On the contrary, the second stopper portion 4*c* is inclined so that an angle $\beta$ formed by the second stopper portion 4*c* and the support portion 4*d* is an obtuse angle.

When the developer supply container 1 is mounted, the first stopper portion 4*b* is engaged with the guide portion 8*g* of the developer receiving apparatus 8 and is displaced to pass through the second shutter stopper portion 8*b*, thus engaging with the first shutter stopper portion 8*a*. As the first stopper portion 4*b* and the first shutter stopper portion 8*a* are engaged with each other, the position of the shutter 4 with respect to the developer receiving apparatus 8 is fixed. The second stopper portion 4*c* is engaged with the second shutter stopper portion 8*b* of the developer receiving apparatus 8 to release the first stopper portion 4*b* from the first shutter stopper portion 8*a* at the time of removing the developer supply container 1. By this, the shutter 4 is dismounted from the developer receiving apparatus 8.

[Pump Portion]

Referring to parts (a) and (b) of FIG. 10, the pump portion 5 will be described. The pump portion 5 alternately and repeatedly changes the internal pressure of the developer accommodating portion 2*c*, switching between a state lower than the atmospheric pressure and a state higher than atmospheric pressure by the driving force received by the drive receiving portion 2*d* of the container body 2 (FIG. 6). In this embodiment, in order to stably discharge the developer through the small container discharge opening 3*a*4 as described above, the pump portion 5 is provided at a portion of the developer supply container 1. The pump portion 5 is a displacement type pump in which a volume is changed. More specifically, the pump portion 5 employed in this embodiment has a bellows-like stretchable member capable of expanding and contracting.

The pressure inside the developer supply container 1 is changed by the expansion and contracting operations of the pump portion 5, and the developer is discharged by utilizing the pressure. More specifically, when the pump portion 5 is contracted, the interior of the developer supply container 1 is brought into a compressed state, and the developer is pushed out to discharge through the container discharge opening 3*a*4 of the developer supply container 1. In addition, when the pump portion 5 is expanded, the interior of the developer supply container 1 is brought into a reduced pressure state, and the air is taken in from the outside through the container discharge opening 3*a*4. By air taken in, the developer in the container discharge opening 3*a*4 and in the neighborhood of the reservoir 3*a*3 (part (a) in FIG. 7) that stores the developer transported from the container body 2 of the flange portion 3 is loosened and smoothly discharged.

That is, in the neighborhood of the container discharge opening 3*a*4 of the developer supply container 1 and the neighborhood of the storage portion 3*a*3, the developer in the developer supply container 1 may gather due to vibrations imparted when transporting the developer supply container 1 and so on, with the possible result that the developer is caked in this portion. Therefore, as described above, the air is taken in through the container discharge opening 3*a*4, so that it is possible to loosen the developer that has been caked. In addition, in the usual discharging operation of the developer, as air is taken in as described above, the air and the powder as the developer are mixed with the result that the flowability of the developer is enhanced, and therefore, clogging of the developer does not easily occur, as an additional advantage. By repeatedly performing the expansion and contracting operation as described above, the developer is discharged.

As shown in part (a) of FIG. 10, in the pump portion 5, a junction portion 5*b* is provided so as to be able to be joined with the flange portion 3 on the opening end side (dismounting direction B). In this embodiment, screw threads are formed as the joint portion 5*b*. In addition, as shown in part (b) of FIG. 10, the pump portion 5 has a reciprocating member engaging portion 5*c* which engages with the reciprocating member 6 (parts (a) and (b) of FIG. 11), which will be described hereinafter, on the other end side (the mounting direction A side) opposite to the opening end.

In addition, the pump portion 5 has a bellows-shaped expandable portion (bellows portion, expansion and contraction member) 5*a* in which crests and bottoms are alternately formed periodically. The expansion and contraction portion 5*a* is capable of contracting by moving the reciprocating member engaging portion 5*c* in the dismounting direction B with respect to the joining portion 5*b* along the folding lines (with folding lines as the base point), and is capable of expanding by moving reciprocating member engaging portion 5*c* in the mounting direction A. Therefore, when the bellows-like pump portion 5 as employed in this embodiment, it is possible to reduce variations in volumetric change with respect to the expansion and contraction amount, and therefore, it is possible to accomplish the stable volumetric change.

Here, in this embodiment, polypropylene resin is used as the material of the pump portion 5, but the present invention is not limited to this example. As for the material (material) of the pump portion 5, any material may be used as long as it has an expansion and contraction function and is capable of changing the internal pressure of the developer accommodating portion by changing the volume. For example, ABS (acrylonitrile-butadiene-styrene copolymer), polystyrene, polyester, polyethylene, and so on are usable. Or, rubber, other stretchable materials or the like can also be used.

[Reciprocating Member]

Referring to parts (a) and (b) of FIG. 11, the reciprocating member 6 will be described. In order to change the volume of the pump portion 5, the reciprocating member 6 is provided with a pump engaging portion 6*a* (part (b) of FIG. 13) which engages with the reciprocating member engaging portion 5*c* provided on the pump portion (part (b) of FIG. 10). In addition, the reciprocating member 6 is provided with an engaging projection 6*b* to be engaged with the above-described cam groove 2*b* (FIG. 6) at the time of assembly. The engaging projection 6*b* is provided at the free end portion of the arm 6*c* extending in the mounting and dismounting direction from the neighborhood of the pump engaging portion 6*a*. In addition, the reciprocating member 6 is regulated in rotation around the rotation axis P (part (a) of FIG. 5) of the arm 6*c* by the reciprocating member holding portion 7*b* (part (b) of FIG. 12) of the cover 7 which will be described hereinafter. Therefore, when the container main body 2 is driven by the drive receiving portion 2*d* by the driving gear 9, and the cam groove 2*b* rotates integrally, the reciprocating member 6 reciprocates back and forth in the directions An and B by the urging action of the engaging projection 6*b* fitted in the cam groove 2*b* and the reciprocating member holding portion 7*b* of the cover 7. Accordingly, the pump portion 5 engaged with the pump engaging portion 6*a* of the reciprocating member 6 by way of the reciprocating member engaging portion 5*c* expands and contracts in the dismounting direction B and the mounting direction A.

[Cover]

Referring to parts (a) and (b) of FIG. 12, the cover 7 will be described. As described above, the cover 7 is provided as shown in part (b) of FIG. 5 for the purpose of improving the appearance of the developer supply container 1 and protecting the reciprocating member 6 and the pump portion 5. In more detail, the cover 7 is provided so as to cover the entirety of the flange portion 3, the pump portion 5, and the reciprocating member 6. As shown in part (a) of FIG. 12, the cover 7 is provided with a guide groove 7*a* to be guided by the insertion guide 8*e* (part (a) of FIG. 3) of the developer receiving apparatus 8. In addition, as shown in part (b) of FIG. 12, the cover 7 is provided with a reciprocating member holding portion 7*b* for restricting rotation of the reciprocating member 6 about the rotation axis P (part (a) of FIG. 5).

[Mounting Operation of Developer Supplying Container]

Referring to parts (a) of FIG. 13 to (b) of FIG. 16, the operation of mounting the developer supply container 1 to the developer receiving apparatus 8 will be described. Here, part (a) of FIG. 13 to part (b) of FIG. 14 show the positional relationship of the engaging portion 30, the engaged portion 11*b* and the developer receiving portion 11, in the insertion and removal direction and in the up and down direction. In addition, part (a) of FIG. 15 to part (b) of FIG. 16 shows a connecting portion between the shutter opening 4*j* and the receiving opening 11*a*. Also, part (a) of FIG. 13 and Part (a) of FIG. 15 show the state when the engaged portion 11*b* is engaged with the first engaging surface 31*a* as the developer supply container 1 is inserted, part (b) of FIG. 13 and part (b) of FIG. 15 show the state when the engaged portion 11*b* is positioned at the upstream side end portion 31*b*, in the mounting direction A, of the first engaging surface 31*a*. In addition, part (a) of FIG. 14 and Part (a) of FIG. 16 show the state when the engaged portion 11*b* is positioned at the projecting portion 33 of the third engaging surface 33*a*, and part (b) of FIG. 14 and part (b) of FIG. 16 show the state when the engaged portion 11*b* is positioned on the second engaging surface 32*a* as the mounting of the developer supply container 1 is completed.

As shown in part (a) of FIG. 13, when the developer supply container 1 is moved in the mounting direction A, the engaged portion 11*b* of the developer receiving portion 11 is contacted to the lower side portion of the first engaging surface 31*a* of the engaging portion 30 of the developer supply container 1. At this time, as shown in part (a) of FIG. 15, the developer receiving portion 11 does not yet move in the upward direction U approaching the developer supply container 1, and the developer supply container 1 and the main assembly seal 13 are not in contact with each other. For this reason, the thickness of the main assembly seal 13 remains 3.0 mm. In addition, as shown in part (a) of FIG. 9, in the shutter 4, the stopper portions 4*b* and 4*c* are engaged with the shutter stopper portions 8*a* and 8*b* of the developer receiving device 8, and therefore, the position of the shutter 4 in the mounting direction A is fixed with respect to the developer receiving device 8. Therefore, even when the developer supply container 1 is further moved in the mounting direction A, the shutter 4 moves relative to the developer supply container 1 except the shutter 4 in the mounting direction A, but it does not move relative to the developer receiving portion 11 in the inserting/removing direction.

When the developer supply container 1 is further moved in the mounting direction A, the engaged portion 11*b* of the developer receiving portion 11 is guided by the first engaging surface 31*a*, so that the developer receiving portion 11 is lifted upward direction U toward the developer supply container. And, as shown in part (b) of FIG. 13, slightly before the engaged portion 11*b* is positioned at the upstream side end portion 31*b*, in the mounting direction A, of the first engaging surface 31*a*, the upper end surface of the main assembly seal 13 passes by the opening portion 3*e* of the bottom portion 3*d* of the flange portion 3 in the upward direction U, as shown in part (b) of FIG. 15. Also, the upper end surface of the main assembly seal 13 abuts to the connecting face 4*k* of the shutter 4 and slightly collapses the main assembly seal until the engaged portion 11*b* is located at the upstream side end portion 31*b*, in the mounting direction A, of the first engaging face 31*a*13 in the vertical direction. In this embodiment, when the engaged portion 11*b* is positioned at the upstream side end portion 31*b*, in the mounting direction A, of the first engaging surface 31*a*, the main assembly seal 13 is collapsed by an amount of 1.0 mm, and therefore, the thickness thereof becomes 2.0 mm. By this, the receiving opening 11*a* and the shutter opening 4*j* communicate with each other. Here, the upstream side end portion 31*b* of the first engaging surface 31*a* in the mounting direction A is provided at the same height as the second engaging surface 32*a*. For this reason, the amount by which the main assembly seal 13 is collapsed at this point is the same as the amount to be collapsed when actually supplying the developer after mounting the developer supply container 1.

When the developer supply container 1 is further moved in the mounting direction A, as shown in part (a) of FIG. 14, the engaged portion 11*b* of the developer receiving portion 11 is guided by the projecting portion 33 of the third engaging surface 33*a*, and the developer receiving portion 11 is raised by a distance L1 in the upward direction U further toward the developer supply container 1. And, as shown in part (a) of FIG. 16, the main assembly seal 13 is more strongly pressed against the connecting surface 4*k* and is collapsed to a thickness of 1.5 mm with a collapse amount of 1.5 mm. At this time, the shutter opening 4*j* is not in communication with the container discharge opening 3*a*4, and therefore, the developer is not supplied from the developer supply container 1 to the apparatus main assembly 100*a*. As described above, in the process of inserting the developer supply container 1 into the developer receiving device 8, the developer receiving portion 11 temporarily becomes closer to the developer supply container than in a holding position which is taken at the time of completion of mounting of the developer supply container 1. By this, it is possible to prevent improper sealing due to partial contact between the main assembly seal 13 and the shutter 4 or due to insufficient lifting of the developer receiving portion 11.

When the developer supply container 1 is further moved in the mounting direction A and the developer supply container 1 is pushed into the mounting completion position, as shown in part (b) of FIG. 14, the engaged portion 11*b* of the developer receiving portion 11 rides over the projecting portion 33 of the third engaging surface 33*a* and then is positioned on the second engaging surface 32*a*. By this, the developer receiving portion 11 is lowered in the downward direction D by a distance L1. And, as shown in part (b) of FIG. 16, the main assembly seal 13 weakens the pressing force to the coupling surface 4*k*, such that the crush amount becomes back to 1.0 mm, and the thickness is returned to 2.0 mm. In addition, the shutter opening 4*j* and the container discharge opening 3*a*4 communicate with each other, and the developer supply container 1 makes a state in which the developer can be supplied to the apparatus main assembly 100*a*. Here, as shown in part (b) of FIG. 14, the positional relationship between the container discharge opening 3*a*4 and the second engaging surface 32*a* is such that the plane L passing through the container discharge opening 3*a*4 and perpendicular to the rotation axis P passes through the second engaging surface 32*a*. In addition, the plane including the second engaging surface 32*a* is in a positional relationship to be disposed between the rotation axis P and the container discharge opening 3*a*4.

As described in the foregoing, according to the developer supply container 1 of this embodiment, during the process of inserting the developer supply container 1 into the developer receiving device 8, the developer receiving portion 11 temporarily moves to a position closer to the developer supply container 1 than that in the holding position taken at the completion of mounting of the developer supply container 1. By this, it is possible to prevent poor sealing due to partial contact between the main assembly seal 13 and the shutter 4 or due to insufficient lifting of the developer receiving portion 11, thereby to improve the sealing property of the connecting portion between the developer supply container 1 and the developer receiving portion 11. In addition, a suitable click feeling can be provided when the engaged portion 11*b* rides over the projecting portion 33 when the developer supply container 1 is mounted to or dismounted from the apparatus main assembly 100*a*, and therefore, it is possible to easily feel the mounted state of the developer supply container 1, thus improving operability.

Here, in order to improve the sealing property of the connecting portion between the developer supply container 1 and the developer receiving portion 11, it would be considered that when the mounting of the developer supply container 1 is completed, the main assembly seal 13 is deformed to 1.5 mm with the collapse amount of 1.5 mm. However, in such a case, the compression rate of the main assembly seal 13 is increased in the state the developer supply container 1 is completely mounted, with the result that the reaction force is increased, and a large force is always continuously applied to the engaged portion 11*b*. Then, there arises a likelihood that loss of elasticity of the main assembly seal 13 and the deformation of the engaged portion 11*b* may occur, with the result that the sealing property may be deteriorated.

On the other hand, according to the developer supply container 1 of this embodiment, although the compression amount of the main assembly seal 13 is temporarily increased, it is returned to the normal compression amount when the mounting of the developer supply container 1 is completed, and therefore, a large load is not continuously applied to the portions such as the main assembly seal 13 and the engaged portion 11*b*. For this reason, it is possible to prevent deterioration of the sealing property due to the loss of elasticity of the main assembly seal 13 due to excessive load and deformation of the engaged portion 11*b*.

Here, in the above embodiment, as shown in FIG. 8, the third engaging surface 33*a* of the engaging portion 30 has a surface parallel to the inserting/removing direction of the upper surface of the projecting portion 33, but it is not limited to this example. For example, as in the first modification shown in part (a) of FIG. 17, the projecting portion 33 of the third engaging surface 33*a* may not have a plane parallel to the inserting/removing direction, but has an apex projecting in the upward direction U as seen from a lateral side. The surface continuous to this apex in either of the mounting direction A and the dismounting direction B is also a surface inclined in the downward direction D, by which the developer receiving portion 11 is temporarily moved closer to the developer supply container than in the holding position at the time of completion of mounting of the developer supply container 1.

In addition, in the above-described embodiment, as shown in FIG. 8, the parallel portion 32 of the engaging portion 30 is located on the side of the inclined portion 31 in the dismounting direction B, but it is not limited to this example. For example, as in the second modification shown in part (b) of FIG. 17, by providing the projecting portion 33 on the upward direction U side of the front end portion, in the mounting direction A, of the parallel portion 32, the inclined portion 31 and the parallel portion 32 may partially overlap with each other.

In addition, in the above embodiment, as shown in FIG. 8, the third engaging surface 33*a* is provided on the inclined portion 31, but this is not restrictive to the present invention. For example, the third engaging surface 33*a* including the projecting portion 33 may be provided on the upper surface of the front end portion of the parallel portion 32 in the mounting direction A as in the third modification shown in part (c) of FIG. 17. Or, as in the fourth modification shown in part (a) of FIG. 18, the third engaging surface 33*a* including the projecting portion 33 straddles the leading end portion, in the dismounting direction B, of the inclined portion 31 and the leading end portion, in the mounting direction A, of the parallel portion 32.

In addition, in the above embodiment, as shown in FIG. 8, in the engaging portion 30, the inclined portion 31 and the parallel portion 32 are separate members, but it is not limited to this example. For example, as in the fifth modified example shown in part (b) of FIG. 18, the inclined portion 31 and the parallel portion 32 may be formed by a single member. In this case, the first engaging surface 31*a*, the second engaging surface 32*a*, and the third engaging surface 33*a* are integrally molded. Even in this case, the engaging portion 30 may be formed separately from the flange portion 3 and integrated with the flange portion 3 by adhesion or the like, or the engaging portion 30 and the flange portion 3 may be formed integrally by injection molding or the like.

In addition, in the above embodiment, as shown in FIG. 8, the third engaging surface 33*a* has only one projecting portion 33, but the present invention is not limited to this example, and the third engaging surface 33*a* may have a plurality of projecting portions. For example, as in the sixth modified example shown in part (c) of FIG. 18, the third engaging surface 33*a* may have two projecting portions of the first projecting portion 33 and the second projecting portion 34. In such a case, the first projecting portion 33 is provided continuously from the leading end, in the dismounting direction B, of the first engaging surface 31*a*, and the second projecting portion 34 is provided continuously from the leading end, in the mounting direction A, of the second engaging surface 32*a*, and it is disposed with a slight space from the first projecting portion 33. By this, when the developer supply container 1 is mounted, the engaged portion 11*b* of the developer receiving portion 11 is guided by the projecting portions 33, 34 of the third engaging surface 33*a*, and the developer receiving portion 11 is intermittently pressed twice against the supply container 1. By this, it is possible to more effectively prevent seal failure due to partial contact between the main assembly seal 13 and the shutter 4 and insufficient lifting of the developer receiving portion 11.

In addition, in the embodiment described above, the second engaging surface 32*a* is a parallel surface provided substantially in parallel with the mounting direction A, but the present invention is not limited to this example. In this case, the developer receiving device 8 retracting device is provided. By this, the developer supply container 1 is fixed at a predetermined mounting position in a state that it is retracted in the mounting direction by the retracting device, and therefore, the developer supply container 1 does not move in the dismounting direction unless an operator or the like takes out by applying a force. Therefore, even if the second engaging surface 32*a* is not a parallel surface, the engaged portion 11*b* does not unintentionally move in the dismounting direction B.

Embodiment 2

Next, Embodiment 2 of the present invention will be described in detail referring to FIG. 19 to part (b) of FIG. 20. In Embodiment 1 described above, regardless of the engagement with the engaged portion 11*b*, the engaging portion 30 has a shape that does not deform. On the contrary, in the case of this embodiment, the engaging portion 130 is deformed by engagement with the engaged portion 11*b* with the mounting operation of the developer supply container 1.

Other structures and operations are the same as in Embodiment 1 described above, and therefore, the same reference numerals are used for the same components, and the illustration and explanation thereof are omitted or simplified, and the different portions from Embodiment 1 will be mainly described below.

In this embodiment, as shown in FIG. 19 and part (a) of FIG. 20, the flange portion 3 is provided with an engaging portion 130 engageable with the engaged portion 11*b* of the developer receiving portion 11. The engaging portion 130 fixes the base end portion (fixed portion) 130*a* on the mounting direction A side to the flange portion 3, and the other portion is provided so as to be displaceable relative to the flange portion 3. And, the engaging portion 130 is, as shown in part (a) of FIG. 19, before engaging with the engaged portion 11*b*, it is provided in a state the dismounting direction B side is inclined upward in the U direction. The engaging portion 130 has a first engaging surface 131*a*, a second engaging surface 132*a*, and a contact portion 134*a*. The first engaging surface 131*a* has an elastic portion 130*c* capable of displacing at the upper end in the vertical direction and has a shape that faces upward in the vertical direction as it approaches to the developer accommodating portion 2*c*. The second engaging surface 132*a* is engaged with the engaged portion 11*b* when the receiving opening 11*a* communicates with the shutter opening 4*j*. When the engaged portion 11*b* is engaged with the elastic portion 130*c*, the contact portion 134*a* contacts the deformed elastic portion 130*c* to form a path for guiding the engaged portion 11*b* to the second engaging surface 132*a*.

As shown in part (b) of FIG. 20, the engaging portion 130 is elastically deformed by engagement with the engaged portion 11*b* with the mounting operation of the developer supply container 1. And, the structure is such that the locus 140 of the engaged portion 11*b* when the engaged portion 11*b* relatively moves with respect to the engaging portion 130 by the mounting operation has a first region 141, a second region 142, and a third region 143. The first region 141 of the locus 140 is an upward direction U toward the upstream side, in the mounting direction A, of the developer supply container 1. The second region 142 of the locus 140 is located on the upstream side, in the mounting direction A, of the first region 141, and is provided at the same height (position) as the height (position) the upstream side end portion 141*a* in the upward direction U, in the mounting direction A, of the first region 141. The third region 143 of the locus 140 continuously includes a projecting region 143*a* which projects in the upward direction U beyond the second region 142 to guide the engaged portion 11*b* between the first region 141 and the second region 142.

In addition, in this embodiment, the positioning portion 134 which abuts against the free end portion 130*b* of the elastically deformed engaging portion 130 and positions the free end portion 130*b* is provided on the upstream side of the engaging portion 130 of the flange portion 3 in the mounting direction A. The engaging portion 130 elastically deforms until the free end portion 130*b* abuts against the contact portion 134*a* formed on the mounting direction A side of the positioning portion 134 with the base end portion 130*a* as the base end. As shown in part (b) of FIG. 20, the upper surface of the positioning portion 134 is a horizontal surface parallel to the inserting/removing direction, and is continuous with the upper surface of the engaging portion 130 in a state that the free end portion 130*b* is engaged and positioned.

As shown in part (a) of FIG. 20, when the engaged portion 11*b* and the elastic portion 130*c* are not engaged with each other, the elastic portion 130*c* is separated from the contact portion 134*a*. The engaging portion 130 is elastically deformed by engagement with the engaged portion 11*b* with the mounting operation of the developer supply container 1. And, finally, as shown in part (b) of FIG. 20, the locus 140 of the engaged portion 11*b* becomes having the first region 141, the second region 142, and the third region 143. That is, when the elastic portion 130*c* contacts the contact portion 134*a*, the height of a portion of the elastic portion 130*c* in the vertical direction is higher than the height of the second engaging surface 132*a*. In the engaging portion 130, the rigidity of each portion is selected such that the locus 140 of the engaged portion 11*b* finally becomes such a locus. For example, by making the end portion 130*b* side lower than the base end portion 130*a* side of the engaging portion 130, the deformed portion 11*b* hardly deforms until the engaged portion 11*b* reaches the free end side, and the engaged portion 11*b* suddenly moves toward the free end side after it reaches the free end portion. By doing so, the locus 140 of the engaged portion 11*b* as shown in part (b) of FIG. 20 can be accomplished.

Here, as shown in part (b) of FIG. 20, in a state after completion of mounting of the developer supply container 1, the engaging portion 130 has the first engaging surface 131*a*, the second engaging surface 132*a*, and the third engaging surface 133*a*. The locus along which the engaged portion 11*b* guided by the first engaging surface 131*a* passes forms the first region 141 of the locus 140. The locus along which the engaged portion 11*b* guided by the third engaging surface 133*a* passes forms the third region 143 of the locus 140. The locus along which the engaged portion 11*b* guided by the second engaging surface 132*a* passes forms the second region 142 of the locus 140. The shapes and operations of the engaging surfaces 131*a*, 132*a*, and 133*a* are the same as in Embodiment 1.

The description will be made as to the deformation of the engaging portion 130 with the mounting operation of the developer supply container 1 to the developer receiving device 8, referring to parts (a) and (b) of FIG. 20. When starting mounting of the developer supply container 1, as shown in part (a) of FIG. 20, the engaged portion 11*b* approaches to the neighborhood of the base end portion 130*a* of the engaging portion 130. At this time, the engaged portion 11*b* is not engaged with the engaging portion 130, and therefore, the engaging portion 130 is not deformed.

Next, when the developer supply container 1 is further inserted in the mounting direction A, the engaged portion 11*b* and the engaging portion 130 are engaged with each other, so that the engaged portion 11*b* is displaced in the direction U by the engagement with the engaging portion 130, and the movement is along the first region 141 of the locus 140. And, as shown in part (b) of FIG. 20, when the engaged portion 11*b* reaches the upstream side end portion 141*a*, in the mounting direction A, of the first region 141, the engaged portion 11*b* is further displaced in the upward direction U, and the movement is along the third region 143 of the locus 140 Moving. At this time, the developer receiving portion 11 is temporarily brought into close proximity temporarily beyond the holding position which is taken at the completion of mounting of the developer supply container 1. By this, it is possible to prevent insufficient sealing due to partial contact between the main assembly seal 13 and the shutter 4 or insufficient lifting of the developer receiving portion 11. Also, when the engaged portion 11*b* reaches from the third region 143 to the second region 142, the developer receiving portion 11 is positioned at the holding position at the completion of mounting of the developer supply container 1.

As described in the foregoing, also in the developer supply container 1 of this embodiment, during the process of inserting the developer supply container 1 into the developer receiving device 8, the developer receiving portion 11 temporarily made closer to the developer supply container beyond the holding position which is taken at the time of the completion of mounting of the developer supply container 1. By this, it is possible to prevent insufficient sealing due to partial contact between the main assembly seal 13 and the shutter 4 or insufficient lift of the developer receiving portion 11 to improve the sealing property of the connecting portion between the developer supply container 1 and the developer receiving portion 11.

Here, in the above embodiment, as shown in part (b) of FIG. 20, the engaging portion 130 has the first engaging surface 131*a*, the second engaging surface 132*a*, and the third engaging surface 133*a*, but the present invention is not limited to this example. For example, the engaging portion 130 may have the first engaging surface 131*a* and the third engaging surface 133*a* and the positioning portion 134 may have the second engaging surface 132*a*. In this case, the horizontal upper surface of the positioning portion 134 becomes the second engaging surface 132*a*, and the contact portion 134*a*, for example is integrally molded with the second engaging surface 132*a*. In addition, there is also a case the engaging portion 130 returns to its original position by being guided by the engaged portion 11*b* to the upper surface of the positioning portion 134. In such a case, by moving the developer supply container 1 in the dismounting direction B, the engaged portion 11*b* moves downward D without engaging with the engaging portion 130 from the end on the mounting direction A side of the positioning portion 134, and the developer receiving portion 11 returns to its original position by the urging force of the urging member 12.

<Other Embodiments>

In the above description, the discharge opening with which the receiving opening 11*a* of the developer receiving portion 11 communicates is the shutter opening 4*j* of the shutter 4, but instead of providing the shutter, the developer receiving portion may be brought into direct contact with the container discharge opening of the developer supply container 1 to communicate therewith. In this case, the container discharge opening corresponds to the discharge opening communicating with the receiving port.

INDUSTRIAL APPLICABILITY

According to the present invention, there is provided a developer supply container and a developer supplying device and a developer supplying system in which the sealing property of the connecting portion between the developer supplying container and the developer receiving portion is improved.

DESCRIPTION OF SYMBOLS

1 developer supply container: 2*c* developer casing portion: 4*j* shutter opening (discharge port): 8 developer receiving device: 11 developer receiving portion: 11*a* receiving opening: 11*b* engaged portion: 12 urging member (urging portion): 13 main assembly seal (seal portion): 30 engagement portion: 31*a* first engaging surface: 31*b* upstream side end portion, in the mounting direction, of the first engaging surface: 32*a* second engaging surface: 33 projecting portion: 33*a* third engaging surface: 130 engaging portion: 130*a* securing portion: 130*b* free end portion: 130*c* resilient portion: 134*a* abutting portion: 140 locus: 141 first region: 142 second region: 143 third region: 143*a* projecting region: 200 developer supply system: 300 discharge portion: A mounting direction: U upward direction (displacing direction).

The invention claimed is:

1. A developer supply container detachably mountable to a developer receiving apparatus, the developer receiving apparatus including a developer receiving portion provided with a receiving port for receiving a developer and including a portion-to-be-engaged capable of displacing integrally with the developer receiving portion, the developer supply container comprising:

a rotatable developer accommodating portion for accommodating the developer;

a discharging portion provided at a bottom side thereof with a discharge opening for discharging the developer accommodating in the developer accommodating portion;

an engaging portion engageable with the portion-to-be-engaged with a mounting operation of the developer supply container to displace the developer receiving portion in a displacing direction so as to bring the receiving opening into fluid communication with the discharge opening; and a supporting portion provided upstream of the engaging portion in an inserting direction in which the developer accommodating portion is inserted into the developer receiving apparatus, the supporting portion extending in a direction of a rotational axis of the developer accommodating portion, and the supporting portion being capable of supporting the portion-to-be-engaged delivered from the engaging portion, wherein, when the discharge opening and the receiving opening are in fluid communication with each other, a maximum height of the engaging portion is higher than a supporting surface of the supporting portion which supports the portion-to-be-engaged, and wherein a downstream end of the supporting portion in the inserting direction is between a bottom end portion and a top end portion of the engaging portion, and wherein the supporting portion connects to the engaging portion between the bottom end portion and the top end portion.

* * * * *